(12) United States Patent
Nakagawa et al.

(10) Patent No.: US 12,149,840 B2
(45) Date of Patent: Nov. 19, 2024

(54) RANGING SYSTEM AND ELECTRONIC APPARATUS

(71) Applicants: SONY GROUP CORPORATION, Tokyo (JP); SONY SEMICONDUCTOR SOLUTIONS CORPORATION, Kanagawa (JP)

(72) Inventors: Kei Nakagawa, Tokyo (JP); Shota Watanabe, Kanagawa (JP)

(73) Assignees: Sony Group Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 284 days.

(21) Appl. No.: 17/636,418

(22) PCT Filed: Jun. 10, 2020

(86) PCT No.: PCT/JP2020/022783
§ 371 (c)(1),
(2) Date: Feb. 18, 2022

(87) PCT Pub. No.: WO2021/039022
PCT Pub. Date: Mar. 4, 2021

(65) Prior Publication Data
US 2022/0400218 A1    Dec. 15, 2022

(30) Foreign Application Priority Data
Aug. 27, 2019    (JP) ................. 2019-154499

(51) Int. Cl.
*H04N 5/351*    (2011.01)
*G01B 11/22*    (2006.01)
(Continued)

(52) U.S. Cl.
CPC ............. *H04N 25/50* (2023.01); *G01B 11/22* (2013.01); *G01S 7/4814* (2013.01);
(Continued)

(58) Field of Classification Search
CPC ...... H04N 25/50; H04N 23/84; H04N 25/709; H04N 25/75; H04N 13/271; H04N 13/254;
(Continued)

(56) References Cited

U.S. PATENT DOCUMENTS 10,302,420 B2    5/2019    Brandli
10,540,774 B1    1/2020    Hsieh
(Continued)

FOREIGN PATENT DOCUMENTS

CN    106165399 A    11/2016
CN    108139207 A    6/2018
(Continued)

OTHER PUBLICATIONS

International Search Report prepared by the European Patent Office on Sep. 7, 2020, for International Application No. PCT/JP2020/022783, 4 pgs.
(Continued)

*Primary Examiner* — Alazar Tilahun
(74) *Attorney, Agent, or Firm* — Sheridan Ross PC

(57) ABSTRACT

A system includes a processor, a light source controlled by the processor and configured to emit a light, and an event based vision sensor controlled by the processor. The sensor includes a plurality of pixels. At least one of the plurality of pixels includes a photosensor configured to detect incident light and first circuitry configured to output a first signal based on an output from the photosensor. The first signal indicates a change of amount of incident light. The sensor includes a comparator configured to output a comparison result based on the first signal and at least one of a first reference voltage and a second reference voltage. The processor is configured to apply one of the first reference
(Continued)

voltage and the second reference voltage to the comparator selectively based on an operation of the light source.

18 Claims, 21 Drawing Sheets

(51) Int. Cl.
| | |
|---|---|
| *G01S 7/481* | (2006.01) |
| *G01S 17/89* | (2020.01) |
| *G06V 40/16* | (2022.01) |
| *H04N 23/84* | (2023.01) |
| *H04N 25/50* | (2023.01) |
| *H04N 25/705* | (2023.01) |
| *H04N 25/709* | (2023.01) |
| *H04N 25/75* | (2023.01) |

(52) U.S. Cl.
CPC ............ *G01S 7/4816* (2013.01); *G01S 17/89* (2013.01); *G06V 40/161* (2022.01); *H04N 23/84* (2023.01); *H04N 25/705* (2023.01); *H04N 25/709* (2023.01); *H04N 25/75* (2023.01)

(58) Field of Classification Search
CPC ... G01B 11/22; G01B 11/2513; G01S 7/4814; G01S 7/4816; G01S 17/89; G06V 40/161; G03B 17/54; G06T 7/521
See application file for complete search history.

(56) References Cited

U.S. PATENT DOCUMENTS

| | | | |
|---|---|---|---|
| 2015/0285625 A1* | 10/2015 | Deane | ............... G01S 7/4817 |
| | | | 348/140 |
| 2017/0033777 A1 | 2/2017 | Kim et al. | |
| 2018/0231660 A1 | 8/2018 | Deane | |
| 2018/0307303 A1 | 10/2018 | Powderly et al. | |
| 2019/0045173 A1 | 2/2019 | Hicks | |
| 2019/0052821 A1 | 2/2019 | Berner | |
| 2019/0277970 A1 | 9/2019 | Deane | |
| 2021/0409629 A1* | 12/2021 | Zahnert | ............... G06T 7/593 |

FOREIGN PATENT DOCUMENTS

| | | |
|---|---|---|
| CN | 109470166 | 3/2019 |
| EP | 3393122 | 3/2018 |
| JP | 2017520134 A | 7/2017 |
| JP | 2018085725 A | 5/2018 |
| WO | WO-2018122798 A1 | 7/2018 |

OTHER PUBLICATIONS

Written Opinion prepared by the European Patent Office on Sep. 7, 2020, for International Application No. PCT/JP2020/022783, 7 pgs.

* cited by examiner

RANGING SYSTEM AND ELECTRONIC APPARATUS

CROSS REFERENCE TO RELATED APPLICATIONS

This application is a national stage application under 35 U.S.C. 371 and claims the benefit of PCT Application No. PCT/JP2020/022783, having an international filing date of 10 Jun. 2020, which designated the United States, which PCT application claimed the benefit of Japanese Priority Patent Application JP2019-154499, filed Aug. 27, 2019, the entire disclosures of each of which are incorporated herein by reference.

TECHNICAL FIELD

The present disclosure relates to a ranging system and an electronic apparatus.

BACKGROUND ART

Technologies related to structured light have been proposed as systems for acquiring a three-dimensional (3D) image (depth information/depth level information of an object surface) and measuring a distance to a subject (for example, see PTL 1). The technologies use a dynamic projector and a dynamic vision camera. According to the technologies related to structured light, the dynamic projector projects light of a predefined pattern on a measurement target/subject, analyzes distortion of the pattern on the basis of an imaging result obtained by the dynamic vision camera, and acquires depth information/distance information.

PTL 1 discloses a technology that uses a vertical-cavity surface-emitting laser (VCSEL) as the dynamic projector that is a light source and uses an event detection sensor called a dynamic vision sensor (DVS) as the dynamic vision camera that is a light receiving section. The event detection sensor is a sensor for detecting that a change in luminance of a pixel for performing photoelectric conversion on incident light exceeds or equals a predetermined threshold, as an event.

CITATION LIST

Patent Literature

PTL 1: United States Patent Publication No. US2019/0045173A1

SUMMARY

Technical Problem

According to the related art described in the above-listed PTL 1, event information resulting from background light or change in the pattern projected on the subject and event information resulting from movement of the subject mixedly come out if the dynamic projector and the event detection sensor are not controlled in synchronization with each other. As a result, to acquire the event information resulting from the movement of the subject, it is necessary for an application processor that processes the event information to perform processing of separating the mixed pieces of event information. However, the related art described in PTL 1 does not consider controlling of the dynamic projector and the event detection sensor in synchronization with each other.

It is desirable to provide a ranging system and an electronic apparatus including the ranging system. The ranging system makes it possible to output event information resulting from movement of a subject without including event information resulting from the other causes therein.

Solution to Problem

According to an embodiment of the present disclosure, there is provided a system comprising: a processor, a light source controlled by the processor and configured to emit a light, and an event based vision sensor controlled by the processor. The sensor includes a plurality of pixels and a comparator. At least one of the plurality of pixels includes a photosensor configured to detect incident light and first circuitry configured to output a first signal based on an output from the photosensor. The first signal indicates a change of amount of incident light. The comparator is configured to output a comparison result based on the first signal and at least one of a first reference voltage and a second reference voltage. The processor is configured to apply one of the first reference voltage and the second reference voltage to the comparator selectively based on an operation of the light source.

According to an aspect of the present disclosure, there is provided a system wherein the operation is one of on event signal detection and off event signal detection.

According to an aspect of the present disclosure, there is provided a system wherein when the first reference voltage is applied to the comparator, the light source emits light and the sensor stores on event data in memory of the system.

According to an aspect of the present disclosure, there is provided a system wherein when the second reference voltage is applied to the comparator, the light source ceases to emit light and the sensor stores off event data in the memory.

According to an aspect of the present disclosure, there is provided a system wherein the stored on event data and off event data are sequentially transferred to a readout circuit.

According to an aspect of the present disclosure, there is provided a system wherein the light source is a vertical-cavity surface-emitting laser.

According to an aspect of the present disclosure, there is provided a system wherein the stored on event data and off event data are used to perform face detection processing.

According to an embodiment of the present disclosure, there is provided a system comprising: an image sensor configured to output an image signal, a light source configured to emit a light, and an event based vision sensor configured to output an event signal. The event based vision sensor includes a plurality of pixels and a comparator. At least one of the plurality of pixels includes a photosensor configured to detect incident light and first circuitry that outputs a first signal based on an output from the photosensor. The first signal indicates a change of amount of incident light. The comparator configured to output a comparison result based on the first signal and at least one of a first reference voltage and a second reference voltage. The system also comprises a system controller configured to control the event based vision sensor and the light source synchronously and a processor. The processor is configured to process the image signal and the event signal. The system controller applies the first reference voltage and the second reference voltage to the comparator selectively based on an operation of the light source.

According to an aspect of the present disclosure, there is provided a system wherein the image sensor comprises an RGB camera.

According to an aspect of the present disclosure, there is provided a system wherein the operation is one of on event signal detection and off event signal detection.

According to an aspect of the present disclosure, there is provided a system wherein when the first reference voltage is applied to the comparator, the light source emits light and the sensor stores on event data in memory of the system.

According to an aspect of the present disclosure, there is provided a system wherein when the second reference voltage is applied to the comparator, the light source ceases to emit light and the sensor stores off event data in the memory.

According to an aspect of the present disclosure, there is provided a system wherein the stored on event data and off event data are sequentially transferred to a readout circuit.

According to an aspect of the present disclosure, there is provided a system wherein the stored on event data and off event data are used to perform face detection processing.

According to an aspect of the present disclosure, there is provided a system wherein the on event data and the off event data are used to generate a depth map.

According to an aspect of the present disclosure, there is provided a system wherein the depth map is used to recognize a face.

According to an aspect of the present disclosure, there is provided a system wherein prior to applying the first reference voltage the face is detected with the image sensor.

According to an aspect of the present disclosure, there is provided a system wherein the processor is configured to recognize a face using the depth map and the image signal.

According to an aspect of the present disclosure, there is provided a system wherein the light source is a vertical-cavity surface-emitting laser.

According to an aspect of the present disclosure, there is provided a system wherein the image sensor is controlled by a camera control section.

According to an embodiment of the present disclosure, there is provided a method of driving a ranging system. The method comprises selectively applying, with a processor, one of a first reference voltage and a second reference voltage to a comparator based on an operation of a light source and comparing, with the comparator the one of the first reference voltage and the second reference voltage with a first signal output by circuitry of a pixel. The light source is controlled by the processor and configured to emit a light. The pixel is one of a plurality of pixels included within an event based vision sensor. The pixel includes a photosensor configured to detect incident light and first circuitry that outputs the first signal based on an output from the photosensor. The first signal indicates a change of amount of incident light.

According to aspects of the present disclosure, there is provided a method wherein the operation is one of on event signal detection and off event signal detection.

According to aspects of the present disclosure, there is provided a method wherein when the first reference voltage is applied to the comparator, the light source emits light and the sensor stores on event data in memory of the system.

According to aspects of the present disclosure, there is provided a method wherein when the second reference voltage is applied to the comparator, the light source ceases to emit light and the sensor stores off event data in the memory.

According to aspects of the present disclosure, there is provided a method wherein the stored on event data and off event data are sequentially transferred to a readout circuit.

According to aspects of the present disclosure, there is provided a method wherein the stored on event data and off event data are used to perform face detection processing.

According to aspects of the present disclosure, there is provided a method wherein the light source is a vertical-cavity surface-emitting laser.

According to an embodiment of the present disclosure, there is provided a ranging system including:
- a light source section configured to emit light to a subject;
- an event detection sensor configured to receive the light reflected by the subject and detect that change in luminance of a pixel exceeds or equals a predetermined threshold, as an event; and
- a control section configured to control the light source section and the event detection sensor in synchronization with each other.

In addition, according to an embodiment of the present disclosure, it is desirable to provide an electronic apparatus including the ranging system configured as described above.

DESCRIPTION OF EMBODIMENTS

Figure 1A:
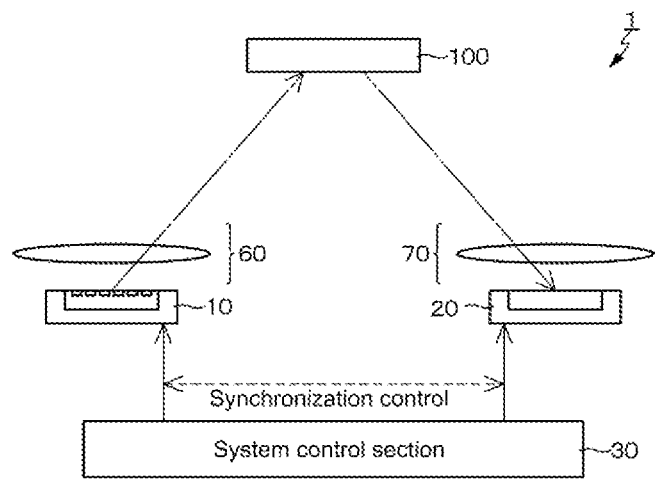
FIG. 1A is a schematic diagram illustrating an example of a configuration of a ranging system according to an embodiment of the present disclosure.

Embodiments for implementing the technology according to the present disclosure (hereinafter, referred to as "embodiments") will be described below in detail with reference to drawings. The technology according to the present disclosure is not limited to the embodiments. In the following description, numerals or symbols same with or similar to each other will refer to elements or functions same with or similar to each other without duplicating explanations. Note that, the description will be given in the following order.

1. General Description of Ranging System and Electronic Apparatus according to Embodiments of Present Disclosure
2. Ranging System according to Embodiment
2-1. System Configuration
2.2 Vertical-Cavity Surface-Emitting Laser (VCSEL)
2-2-1. Random Dot Arrangement
2-2-2. Array Dot Arrangement
2-3. Driving Example of Light Sources according to Array Dot Arrangement
2-3-1. Driving Example 1 of Light Sources (Example of Forming Intensity Peak at Intermediate Position between Two Light Sources)
2-3-2. Driving Example 2 of Light Sources (Example of Concurrently Using Adjustment of Sensitivity of Event Detection Sensor)
2-3-3. Driving Example 3 of Light Sources (Example of Shifting Peak Positions While Adjusting Light Emission Intensities of Two Light Sources to Hold Intensity Peaks Constant When Simultaneously Driving Two Light Sources)
2-4. Event Detection Sensor (DVS)
2-4-1. Configuration Example of Event Detection Sensor
2-4-2. Circuit Configuration Examples of Pixel
2-4-2-1. Circuit Configuration Example 1 (Example of Detecting ON Event and OFF Event in Time-Sharing Manner by Using Single Comparator)
2-4-2-2. Circuit Configuration Example 2 (Example of Detecting ON Event and OFF Event in Parallel by Using Two Comparators)
2-4-2-3. Circuit Configuration Example 3 (Example of Detecting Only ON Event by Using Single Comparator)
2-4-2-4. Circuit Configuration Example 4 (Example of Detecting Only OFF Event by Using Single Comparator)
2-5. Synchronization Control of Vertical-Cavity Surface-Emitting Laser and Event Detection Sensor
2-5-1. Example 1 (Synchronization Control Example Used in Case of Circuit Configuration Example 1)
2-5-2. Example 2 (Synchronization Control Example Used in Case of Circuit Configuration Example 2)
2-5-3. Example 3 (Synchronization Control Example Used in Case of Circuit Configuration Example 3)
2-5-4. Example 4 (Synchronization Control Example Used in Case of Circuit Configuration Example 4)
2-5-5. Example 5 (Example of Pixel Arrangement Used in Case where Pixel Array Section Includes Both ON Pixels and OFF Pixels)
2-5-6. Example 6 (Synchronization Control Example (Part 1) Used in Case of Example 5)
2-5-7. Example 7 (Synchronization Control Example (Part 2) Used in Case of Example 5)
2-5-8. Example 8 (Example Applied to Facial Recognition)
2-5-9. Example 9 (Example in which RGB Camera is Also Included in addition to Event Detection Sensor)
2-5-10. Example 10 (Example Applied to Facial Recognition)
3. Modifications
4. Application Examples
5. Electronic Apparatus according to Embodiment of Present Disclosure (Example of Smartphone)
6. Configuration that Embodiments of Present Disclosure Can Have General Description of Ranging System and Electronic Apparatus According to Embodiments of Present Disclosure In the ranging system and the electronic apparatus according to an embodiment of the present disclosure, the pixel may be configured to have a function of detecting an ON event and an OFF event in a time-sharing manner by using a single comparator, the ON event indicating that an amount of change in photocurrent exceeds or equals an upper limit threshold, the OFF event indicating that an amount of change in photocurrent falls below or equal to a lower limit threshold. In addition, the single comparator may be configured to receive voltage based on photocurrent as a first input, receive voltage for detecting the ON event and voltage for detecting the OFF event that are given in the time-sharing manner as second inputs, and output comparison results between the first input and the second inputs as ON event information and OFF event information.

In the ranging system and the electronic apparatus that include the favorable configuration described above according to the embodiment of the present disclosure, the control section be configured to perform a global reset of the first input of the comparator, set the second input of the comparator to the voltage for detecting the ON event, emit light from the light source section to the subject, store the ON event information in memory, set the second input of the comparator to the voltage for detecting the OFF event, stop emitting the light to the subject, store the OFF event information in memory, and sequentially transfer the ON event information and the OFF event information to a readout circuit.

In addition, in the ranging system and the electronic apparatus that include the favorable configuration described above according to the embodiment of the present disclosure, the pixel may be configured to have a function of detecting an ON event and an OFF event in parallel by using two comparators, the ON event indicating that an amount of change in photocurrent exceeds or equals an upper limit threshold, the OFF event indicating that an amount of change in photocurrent falls below or equals a lower limit threshold. In addition, one of the two comparators may be configured to receive voltage based on photocurrent as a first input, receive voltage for detecting the ON event as a second input, and output a comparison result between the first input and the second input as ON event information, and another of the two comparators may be configured to receive voltage based on photocurrent as a first input, receive voltage for detecting the OFF event as a second input, and output a comparison result between the first input and the second input as OFF event information.

In addition, in the ranging system and the electronic apparatus that include the favorable configuration described above according to the embodiment of the present disclosure, the control section may be configured to perform a global reset of the first inputs of the comparators, emit light from the light source section to the subject, store the ON event information in memory, stop emitting the light to the subject, store the OFF event information in the memory, and sequentially transfer the ON event information and the OFF event information to a readout circuit.

In addition, in the ranging system and the electronic apparatus that include the favorable configuration described above according to the embodiment of the present disclosure, the pixel may be configured to have a function of detecting an ON event by using a single comparator, the ON event indicating that an amount of change in photocurrent exceeds or equals an upper limit threshold. In addition, the single comparator may be configured to receive voltage based on photocurrent as a first input, receive voltage for detecting the ON event as a second input, and output a comparison result between the first input and the second input as ON event information. In addition, the control section may be configured to perform a global reset of the first input of the comparator, emit light from the light source section to the subject, store the ON event information in memory, and sequentially transfer the ON event information to a readout circuit.

In addition, in the ranging system and the electronic apparatus that include the favorable configuration described above according to the embodiment of the present disclosure, the pixel may be configured to have a function of detecting an OFF event by using a single comparator, the OFF event indicating that an amount of change in a photocurrent falls below or equals a lower limit threshold. In addition, the single comparator may be configured to receive voltage based on photocurrent as a first input, receive voltage for detecting the OFF event as a second input, and output a comparison result between the first input and the second input as OFF event information. In addition, the control section may be configured to perform a global reset of the first input of the comparator, emit light from the light source section to the subject, turn on a reset switch connected between a first input terminal and an output terminal of the comparator, stop emitting the light to the subject, store the OFF event information in the memory, and then sequentially transfer the OFF event information to a readout circuit.

In addition, in the ranging system and the electronic apparatus that include the favorable configuration described above according to the embodiment of the present disclosure, a pixel array section of the event detection sensor may include both a first pixel and a second pixel, the first pixel having a function of using a comparator and detecting an ON event indicating that an amount of change in photocurrent exceeds or equals an upper limit threshold, the second pixel having a function of using a comparator and detecting an OFF event indicating that an amount of change in photocurrent falls below or equals a lower limit threshold.

In addition, in the ranging system and the electronic apparatus that include the favorable configuration described above according to the embodiment of the present disclosure, the control section may be configured to first perform a global reset of all pixels including the first pixel and the second pixel, emit light from the light source section to the subject, store ON event information detected by the first pixel in memory, turn on a reset switch connected between a first input terminal and an output terminal of the comparator of the second pixel, stop emitting the light to the subject, store OFF event information detected by the second pixel in memory, sequentially transfer the ON event information and the OFF event information to a readout circuit, and then perform the global reset of a first input of the comparator.

Alternately, in the ranging system and the electronic apparatus that include the favorable configuration described above according to the embodiment of the present disclosure, the control section may be configured to first perform a global reset of all pixels including the first pixel and the second pixel, emit light from the light source section to the subject, store ON event information detected by the first pixel in memory, sequentially transfer the ON event information to a readout circuit, turn on a reset switch connected between a first input terminal and an output terminal of the comparator of the second pixel, stop emitting the light to the subject, store OFF event information detected by the second pixel in memory, sequentially transfer the OFF event information to the readout circuit, and perform the global reset of a first input of the comparator.

In addition, in the ranging system and the electronic apparatus that include the favorable configuration described above according to the embodiment of the present disclosure, the light source section may include a surface-emitting semiconductor laser. A favorable surface-emitting semiconductor laser is a vertical-cavity surface-emitting laser. In addition, the vertical-cavity surface-emitting laser may be configured to project light of a predetermined pattern onto the subject.

A ranging system according to another embodiment of the present disclosure includes:

a light source section configured to emit light to a subject;
  an event detection sensor configured to receive the light reflected by the subject and detect that change in luminance of a pixel exceeds or equals a predetermined threshold, as an event;
  an imaging section configured to capture an image of the subject and generate an image signal;
  a processor configured to process an event signal generated by the event detection sensor, and extract a region of interest on the basis of the image signal from the imaging section; and
  a control section configured to control the light source section and the event detection sensor in synchronization with each other and control the imaging section.

In addition, an electronic apparatus according to the other embodiment of the present disclosure includes the ranging system configured as described above.

In the ranging system and the electronic apparatus that include the configuration described above according to the other embodiment of the present disclosure, the processor may be configured to have a function of acquiring ranging information on the basis of the event signal and performing pattern matching in the region of interest based on the image signal. In addition, the processor may be configured to have a function of performing facial authentication of a user on the basis of the acquired ranging information and the pattern matching.

Ranging System According to Embodiment

A ranging system according to an embodiment of the present disclosure is a system that uses the technology related to structured light to measure a distance to a subject. In addition, it is also possible to use the ranging system according to the embodiment of the present disclosure as a system that acquires three-dimensional (3D) images. In this case, such a system can be called a three-dimensional image acquisition system. According to the technology related to structured light, it is possible to perform ranging by using pattern matching to identify coordinates of a point image and identify which light source (so-called point light source) has projected the point image.

(System Configuration)

Figure 1B:
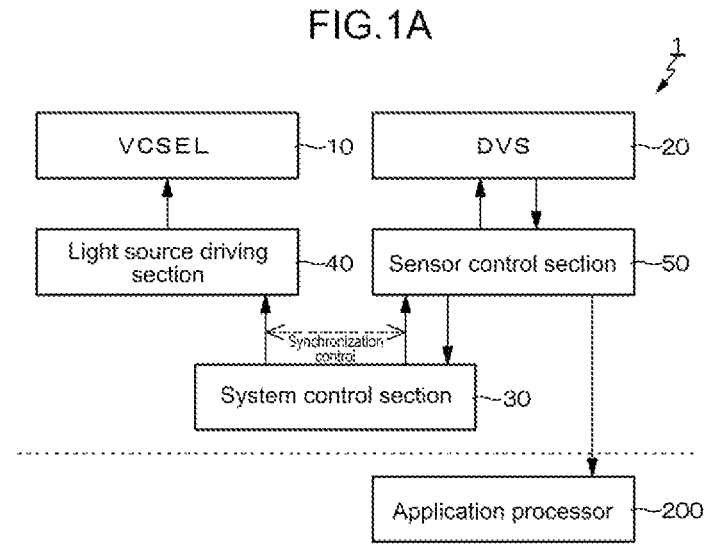
FIG. 1B is a block diagram illustrating an example of a circuit configuration.

FIG. 1A is a schematic diagram illustrating an example of a configuration of the ranging system according to the embodiment of the present disclosure. FIG. 1B is a block diagram illustrating an example of a circuit configuration.

A ranging system according to the present embodiment uses a surface-emitting semiconductor laser such as a vertical-cavity surface-emitting laser (VCSEL) 10 as a light source section and uses an event detection sensor 20 called a DVS as a light receiving section. As used herein, a DVS may also be referred to as an event based vision sensor. The vertical-cavity surface-emitting laser (VCSEL) 10 projects light of a predetermined pattern onto the subject. In addition to the vertical-cavity surface-emitting laser 10 and the event detection sensor 20, the ranging system 1 according to the present embodiment includes a system control section 30, a light source driving section 40, a sensor control section 50, a light source side optical system 60, and a camera side optical system 70.

Details of the vertical-cavity surface-emitting laser (VCSEL) 10 and the event detection sensor (DVS) 20 will be described later. The system control section 30 is implemented by, for example, a processor (e.g., a CPU). The system control section 30 drives the vertical-cavity surface-emitting laser 10 via the light source driving section 40 and drives the event detection sensor 20 via the sensor control section 50. More specifically, the system control section 30 controls the vertical-cavity surface-emitting laser 10 and the event detection sensor 20 in synchronization with each other. Specific examples for controlling the vertical-cavity surface-emitting laser 10 and the event detection sensor 20 in synchronization with each other under the control of the system control section 30 will be described later.

In the ranging system 1 configured as described above according to the present embodiment, the vertical-cavity surface-emitting laser 10 emits light of a predefined pattern, and the light of the predefined pattern passes through the light source side optical system 60 and is projected onto a subject (a measurement target) 100. The subject 100 reflects the projected light. Subsequently, the light reflected by the subject 100 passes through the camera side optical system 70 and enters the event detection sensor 20. The event detection sensor 20 receives the light reflected by the subject 100 and detects that change in luminance of pixels exceeds or equals a predetermined threshold, as an event. Event information detected by the event detection sensor 20 is supplied to an application processor 200 external to the ranging system 1. The application processor 200 performs predetermined processing on the event information detected by the event detection sensor 20.

(Vertical-Cavity Surface-Emitting Laser (VCSEL))
(Random Dot Arrangement)

Figure 2A:
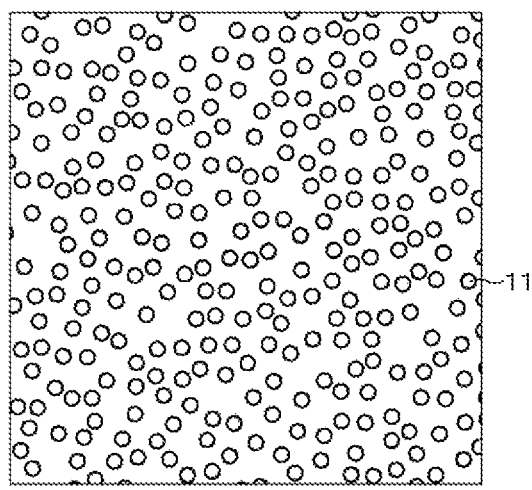
FIG. 2A is a diagram illustrating random dot arrangement of light sources of a vertical-cavity surface-emitting laser in the ranging system according to the embodiment of the present disclosure.

According to the technologies related to structured light, pattern matching in which an affine transformation is considered is necessary to identify coordinates of a point image and identify which light source (point light source) has projected the point image. To achieve the pattern matching in which the affine transformation is considered, light sources 11 of the vertical-cavity surface-emitting laser 10 are peculiarly arranged in a non-repetitive way as illustrated in FIG. 2A. Such arrangement is so-called random dot arrangement characterized by its spatial direction.

The random dot arrangement is also applicable to the ranging system 1 according to the present embodiment with regard to arrangement of the light sources 11 of the vertical-cavity surface-emitting laser 10. However, in the case of the random dot arrangement, it is difficult to increase the number of light sources 11 while maintaining the specificity of the arrangement pattern of the light sources 11 for identifying a light source. Therefore, it may be impossible to improve resolution of a range image decided on the basis of the number of light sources 11. Here, the "range image" is an image for obtaining information regarding a distance to the subject.

(Array Dot Arrangement)

Figure 2B:
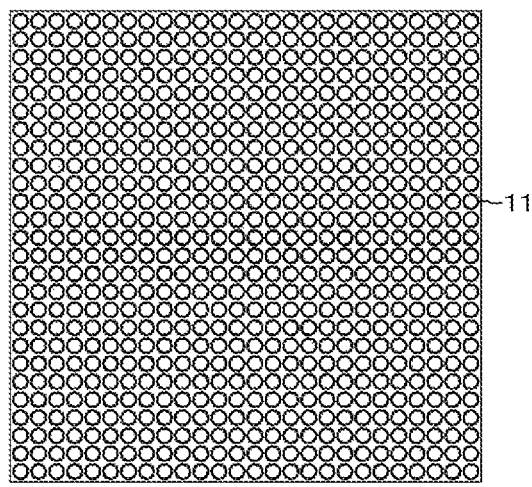
FIG. 2B is a diagram illustrating array dot arrangement of the light sources of the vertical-cavity surface-emitting laser.

Therefore, the ranging system 1 according to the present embodiment uses so-called array dot arrangement as arrangement of the light sources 11 of the vertical-cavity surface-emitting laser 10. According to the array dot arrangement, the light sources 11 are two-dimensionally arranged in an array (in a matrix) at a constant pitch as illustrated in FIG. 2B. It is easy for the ranging system 1 according to the present embodiment in which the vertical-cavity surface-emitting laser 10 and the event detection sensor 20 are combined to identify which of the light sources 11 has projected an image by sequentially turning on the light sources 11 of the vertical-cavity surface-emitting laser 10 and checking time stamps (time information) of events recorded by the event detection sensor 20, without randomly arranging the light sources 11.

In the case of the array dot arrangement, it is possible to increase the number of the light sources 11 in comparison with the case of the random dot arrangement. This makes it possible to improve resolution of the range image decided on the basis of the number of the light sources (dots) 11. It is possible for the ranging system 1 according to the present embodiment to further improve the resolution of the range image from the resolution decided on the basis of the number of the light sources 11 by modifying driving of the light sources 11 of the vertical-cavity surface-emitting laser 10 in the array dot arrangement and also characterizing a time axis direction.

Driving Example of Light Sources According to Array Dot Arrangement

Figure 3A:
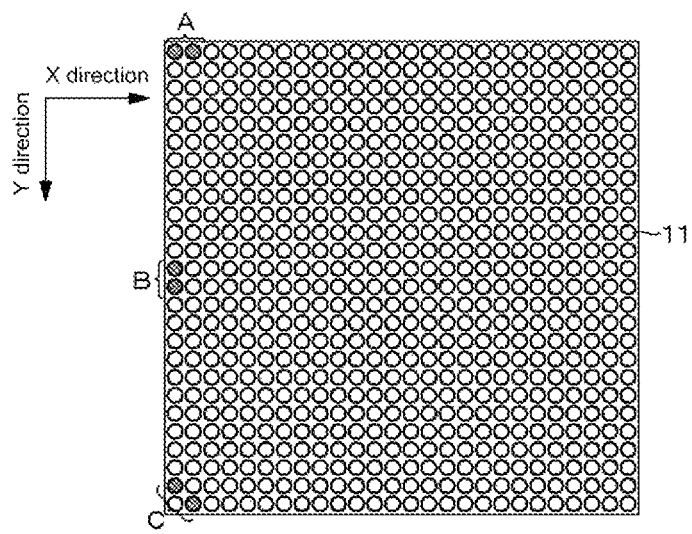
FIG. 3A is a diagram illustrating combinations of two light sources according to the array dot arrangement.

In the case of driving the light sources 11 in the array dot arrangement of the vertical-cavity surface-emitting laser 10, two adjacent light sources 11 and 11 in the array dot arrangement are driven as a unit. As illustrated in FIG. 3A, examples of a combination of the two adjacent light sources 11 and 11 may include a combination A of two adjacent light sources 11 and 11a in a row direction (an X direction), a combination B of two adjacent light sources 11 and 11 in a column direction (a Y direction), and a combination C of two adjacent light sources 11 and 11 in an oblique direction.

Driving Example 1 of Light Sources

Figure 3B:
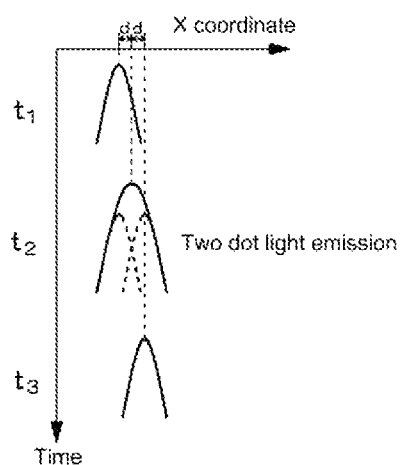
FIG. 3B is a diagram for describing a driving example 1 of the light sources.

Here, driving of light sources based on the combination A will be described as a driving example 1 of the light sources while taking as an example a case of the combination A of the two adjacent light sources 11 and 11 in the row direction. FIG. 3B is a diagram for describing the driving example 1 of light sources. The light sources 11 are driven by the light source driving section 40 under the control of the system control section 30. The same applies to various driving examples described below.

The driving example 1 is an example in which the two adjacent light sources 11 and 11 are simultaneously driven to emit light, and an intensity peak is formed at an intermediate position in a period in which the light sources 11 and 11 are driven to independently emit light. Here, the wording "intermediate position" has a connotation of a strict intermediate position and a connotation of a substantial intermediate position. The presence of various variations occurring in design or manufacturing is allowed. In addition, in the driving example 1, light emission intensities of the two light sources 11 and 11 are assumed to be the same. Here, the wording "same" has a connotation of a case where they are strictly the same and a connotation of a case where they are substantially the same. The presence of various variations occurring in design or manufacturing is allowed.

With regard to the two adjacent light sources 11 and 11 in the row direction (the X direction), a first light source 11 (a light source on the left in FIG. 3A) is driven to emit light (to light up) at a time $t_1$, the two light sources 11 and 11 are simultaneously driven to emit light (two dot light emission driving) at a time $t_2$, and subsequently a second light source 11 (a light source on the right in FIG. 3A) is driven to emit light at a time $t_3$. In other words, under the control of the system control section 30, the two light sources 11 and 11 are simultaneously driven to emit light (at the time $t_2$) in a time period in which the two light sources 11 and 11 are driven to independently emit light between the time $t_1$ and the time $t_3$, that is, in a period between the two light sources 11 and 11, and favorably at an intermediate position in that period.

Here, the time $t_2$ at which the two light sources 11 and 11 are simultaneously driven to emit light is set to an intermediate time between the time $t_1$ and the time $t_3$, that is, a time at an intermediate position between an intensity peak position of the first light source 11 and an intensity peak position of the second light source 11 in the row direction (the X direction). Therefore, an interval between the peak position obtained when the first light source 11 is driven to emit light and the peak position obtained at the time of the two dot light emission driving is an interval d, which is the same as an interval between the peak position obtained at the time of the two dot light emission driving and the peak position obtained when the second light source 11 is driven to emit light.

As described above, in the driving example 1, the two adjacent light sources 11 and 11 are driven as a unit, and operation of simultaneously driving the two light sources 11 and 11 to emit light (in this example, operation of simultaneously driving the two light sources 11 and 11 to emit light in the time period between timings at which the light sources are driven to independently emit light) is performed in addition to operation of driving the two light sources 11 and 11 to independently emit light. This makes it possible to form an intensity peak at a position (in this example, an intermediate position in the period between the two light sources 11 and 11) that is different from the case of driving the two light sources 11 and 11 to independently emit light. Such driving makes it possible to characterize the time axis direction in addition to the spatial direction. Therefore, it is possible to improve resolution of a range image for obtaining information regarding a distance to the subject while maintaining the specificity of the arrangement pattern of the light sources 11 for identifying a light source without increasing the number of the light sources 11.

Note that, in the driving example 1, the two light sources 11 and 11 serving as a unit of driving are set to have a same light emission intensity. However, it is also possible to adjust the light emission intensities of one or both of the two light sources 11 and 11.

In addition, the driving example 1 describes the case of the combination A of the two light sources 11 and 11 as an example. Even in the case of the combination B or the combination C, it is basically possible to improve resolution of a range image while maintaining the specificity of the arrangement pattern of the light sources 11 for identifying a light source without increasing the number of the light sources 11, by driving the light sources 11 in a way similar to the case of the driving example 1. The same applies to various driving examples described below.

Driving Example 2 of Light Sources

The driving example 2 is an example of concurrently using adjustment of sensitivity of the event detection sensor (DVS) 20 in the case of the combination A of the two light sources 11 and 11. Here, for the convenience of description, the first light source 11 (on the left in FIG. 3A) is referred to as a light source 1, and the second light source 11 (on the right in FIG. 3A) is referred to as a light source 2 among the two adjacent light sources 11 and 11 in the row direction (the X direction).

Figure 4:
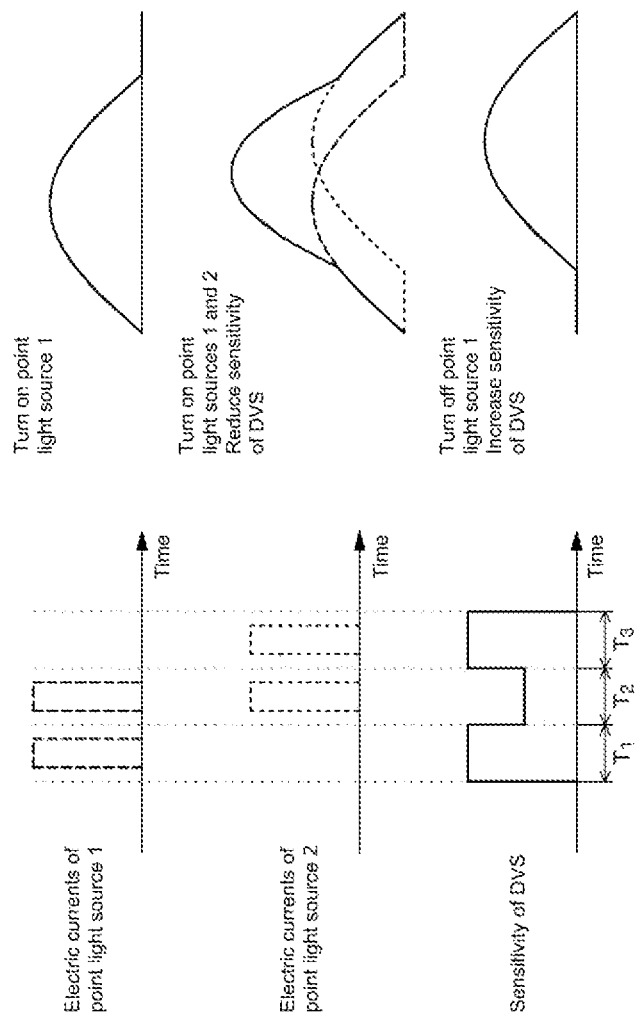
FIG. 4 is a diagram for describing a driving example 2 of the light sources.

FIG. 4 is a diagram for describing a driving example 2 of the light sources. In FIG. 4, electric currents of the light source 1 are indicated by dashed lines, and electric currents of the light source 2 are indicated by dotted lines. In addition, sensitivity of the event detection sensor (DVS) 20 is indicated by a solid line. In the driving example 2, the two light sources 1 and 2 are set to have a same light emission intensity in a way similar to the driving example 1. However, it is also possible to adjust the light emission intensities of one or both of the two light sources 1 and 2.

In the driving example 2, the light source 1 is driven to emit light in a time period $T_1$, and the light source 2 is driven to emit light in a subsequent time period $T_2$. This makes it possible for the light source 1 and the light source 2 to simultaneously emit light in the time period $T_2$. The simultaneous light emission from the light source 1 and the light source 2 makes it possible to raise an intensity peak in the time period $T_2$ more than the case of emitting light only from the light source 1 (this is the same as the case of the driving example 1).

Next, in the time period $T_2$, the sensitivity of the event detection sensor (DVS) 20 is controlled in a manner that the sensitivity in the time period $T_2$ becomes lower than sensitivity obtained when only the light source 1 emits light (in the time period $T_1$). Such control for adjusting the sensitivity of the event detection sensor 20 is performed under the control of the system control section 30 (see FIG. 1). Here, the sensitivity of the event detection sensor 20 becomes lower when the event detection sensor 20 reacts to more incident light.

Next, in a time period $T_3$, the light source 1 is driven to stop emitting light, and this increases the sensitivity of the event detection sensor 20. At this time, it is favorable to return the sensitivity of the event detection sensor 20 to a sensitivity obtained before the light source 1 and the light source 2 have been simultaneously driven to emit light, that is, the same sensitivity as a sensitivity obtained when only the light source 1 emits light (in the time period $T_1$). Here, the wording "same sensitivity" has a connotation of a case where they have exactly the same sensitivities and a connotation of a case where they have substantially the same sensitivities. The presence of various variations occurring in design or manufacturing is allowed.

As described above, in the driving example 2, it is possible to form three reaction positions with regard to the event detection sensor 20 by driving the two light sources 1 and 2 to emit light in the case where the sensitivity of the event detection sensor 20 is set to a lower sensitivity than the sensitivity obtained when only the light source 1 emits light in the time period $T_2$ in which the two light sources 1 and 2 are simultaneously driven to emit light. Such driving makes it possible to characterize the time axis direction in addition to the spatial direction. Therefore, it is possible to improve resolution of a range image while maintaining the specificity of the arrangement pattern of the light sources 11 for identifying a light source without increasing the number of the light sources 11.

Driving Example 3 of Light Sources

The driving example 3 is an example of adjusting light emission intensities of both light sources 11 and 11 to obtain constant intensity peaks and shifting peak positions when the two light sources 11 and 11 are simultaneously driven in the case of the combination A of the two light sources 11 and 11. Here, the wording "constant intensity peaks" has a connotation of a case where the intensity peaks are exactly constant and a connotation of a case where the intensity peaks are substantially constant. The presence of various variations occurring in design or manufacturing is allowed.

Also in the driving example 3, for the convenience of description, the first light source 11 (on the left in FIG. 3A) is referred to as the light source 1, and the second light source 11 (on the right in FIG. 3A) is referred to as the light source 2 among the two adjacent light sources 11 and 11 in the row direction.

Figure 5:
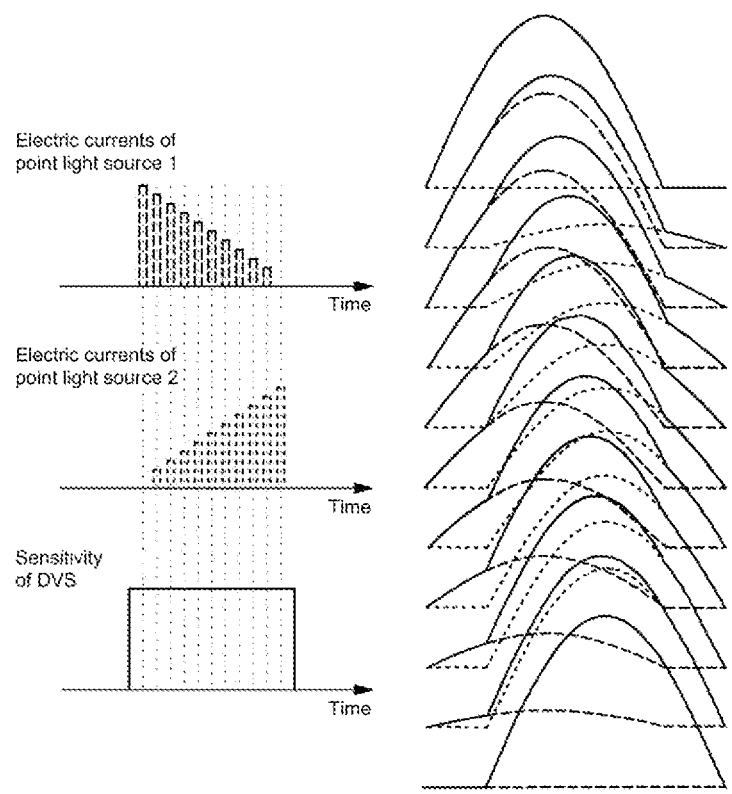
FIG. 5 is a diagram for describing a driving example 3 of the light sources.

FIG. 5 is a diagram for describing a driving example 3 of the light sources. In FIG. 5, electric currents of the light source 1 are indicated by dashed lines, and electric currents of the light source 2 are indicated by dotted lines. In addition, intensity wave forms obtained when only the light source 1 or the light source 2 emits light and when the light sources 1 and 2 simultaneously emit light are indicated by solid lines. In the case of the driving example 3, the sensitivity of the event detection sensor (DVS) 20 is assumed to be constant.

In the driving example 3, the light sources 1 and 2 are driven, for example, in a manner that the light emission intensity of the light source 1 gradually becomes lower and the light emission intensity of the light source 2 gradually becomes higher in synchronization with the reduction in the light emission intensity of the light source 1. This makes it possible to obtain constant intensity peaks when the light source 1 and the light source 2 simultaneously emit light in a time period after light emission (stopping of light emission) from only the light source 1 and before light emission from only the light source 2. Such driving makes it possible to move (shift) the peak positions (little by little) by a predetermined amount at a time while maintaining the constant intensity peaks.

As described above, in the driving example 3, it is possible to form more reaction positions with regard to the event detection sensor 20 by controlling and driving the two light sources 1 and 2 to emit light in a manner that light emission intensities of both the light source 1 and the light source 2 are adjusted to obtain constant intensity peaks when the light source 1 and the light source 2 simultaneously emit light, and the peak positions move by the predetermined amount at a time. Such driving makes it possible to characterize the time axis direction in addition to the spatial direction. Therefore, it is possible to improve resolution of a range image while maintaining the specificity of the arrangement pattern of the light sources 11 for identifying a light source without increasing the number of the light sources 11.

Note that, the driving examples 1 to 3 describe, as an example, the cases where only the light source 1 is driven to emit light, the light source 1 and the light source 2 are driven to simultaneously emit light, and only the light source 2 is driven to emit light on the basis of the combination A of the two light sources 11 and 11. The same repeatedly applies to subsequent procedures. In other words, the light sources are repeatedly driven to emit light in a manner that only the light source 2 emits light, the light source 2 and a light source 3 simultaneously emit light, only the light source 3 emits light, the light source 3 and a light source 4 simultaneously emit light, only the light source 4 emits light, and so on, for example.

In addition, any of the combination A, combination B, or combination C of two adjacent light sources 11 and 11 is adopted optionally. Alternatively, it is also possible to combine them. When the combination A is adopted, it is possible to improve resolution in the row direction (a horizontal direction). When the combination B is adopted, it is possible to improve resolution in the column direction (a vertical direction). When the combination C is adopted, it is possible to improve resolution in the oblique direction.

(Event Detection Sensor (DVS))

Next, the event detection sensor 20 will be described.

(Configuration Example of Event Detection Sensor)

Figure 6:
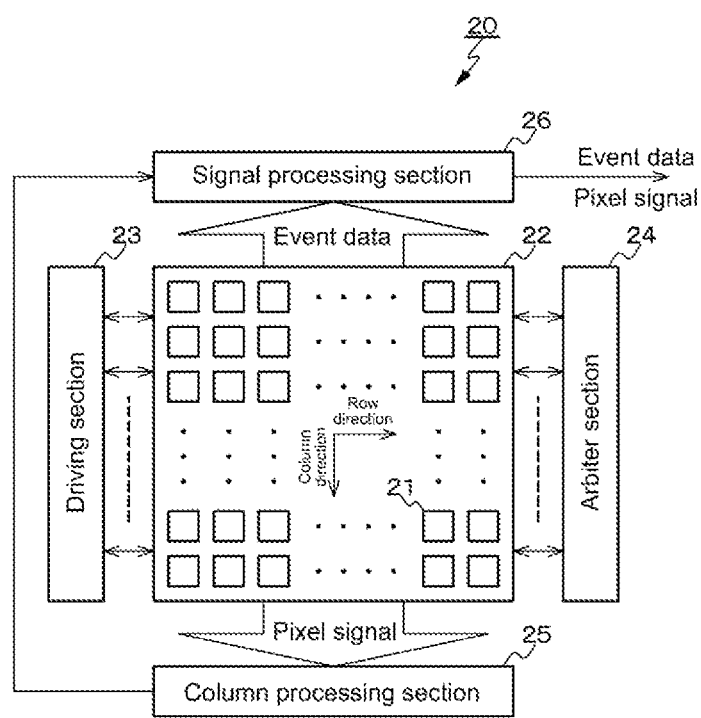
FIG. 6 is a block diagram illustrating an example of a configuration of an event detection sensor in the ranging system according to the embodiment of the present disclosure.

FIG. 6 is a block diagram illustrating an example of a configuration of the event detection sensor 20 in the ranging system 1 configured as described above according to the embodiment of the present disclosure.

The event detection sensor 20 according to this example includes a pixel array section 22 in which a plurality of pixels 21 is two-dimensionally arranged in a matrix (in an array). Each of the plurality of pixels 21 generates, as a pixel signal, an analog signal of voltage corresponding to photocurrent serving as an electric signal generated through photoelectric conversion, and outputs the analog signal. In addition, each of the plurality of pixels 21 detects whether or not an event has occurred on the basis of whether or not change in the photocurrent corresponding to luminance of incident light exceeds or equals a predetermined threshold. In other words, each of the plurality of pixels 21 detects that change in luminance exceeds or equals the predetermined threshold, as an event.

In addition to the pixel array section 22, the event detection sensor 20 includes a driving section 23, an arbiter section (an arbitration section) 24, a column processing section 25, and a signal processing section 26 as peripheral circuit sections to the pixel array section 22.

When an event is detected, each of the plurality of pixels 21 outputs a request to the arbiter section 24. The request demands output of event data indicating occurrence of the event. Next, each of the plurality of pixels 21 outputs the event data to the driving section 23 and the signal processing section 26 in the case of receiving a response from the arbiter section 24. The response indicates permission to output the event data. In addition, the pixel 21 that has detected the event outputs an analog pixel signal generated through photoelectric conversion to the column processing section 25.

The driving section 23 drives the respective pixels 21 in the pixel array section 22. For example, the driving section 23 detects an event, drives pixels 21 that have output event data, and causes output of analog pixel signals of the pixels 21 to the column processing section 25.

The arbiter section 24 arbitrates requests that demand output of the pieces of event data supplied from the respective pixels 21, and transmits responses based on results of the arbitration (whether or not to permit output of the pieces of event data) and reset signals for resetting the event detection to the pixels 21.

The column processing section 25 includes an analog-digital conversion section that includes a set of analog-digital converters installed for each pixel column in the pixel array section 22, for example. Examples of the analog-digital converter includes a single-slope analog-digital converter, a successive approximation analog-digital converter, and a delta-sigma modulation (A modulation) analog-digital converter, for example.

The column processing section 25 performs processing of converting the analog pixel signals output from pixels 21 in a column into digital signals for each pixel column in the pixel array section 22. It is also possible for the column processing section 25 to perform correlated double sampling (CDS) processing on the digitized pixel signals.

The signal processing section 26 performs predetermined signal processing on the digitized pixel signals supplied from the column processing section 25 and the event data output from the pixel array section 22, and outputs the event data and pixel signals that have been subjected to the signal processing.

As described above, change in photocurrent generated by a pixel 21 may also be considered as change in amount of light that has entered the pixel 21 (change in luminance). Therefore, it can be said that the event may be change in amount of light (change in luminance) of a pixel 21 that exceeds or equals the predetermined threshold. The event data that indicates occurrence of the event includes at least positional information such as coordinates indicating a position of a pixel 21 in which change in amount of light has occurred as an event. It is also possible for the event data to include polarity of the change in amount of light in addition to the positional information.

With regard to a sequence of event data output from pixels 21 at timings when events occur, it can be said that the event data implicitly includes time information indicating relative time when the events have occurred as long as intervals between the pieces of event data are maintained as they were when the events have occurred.

However, the time information implicitly included in the event data becomes lost if the intervals between the pieces of event data are not maintained as they were when the events have occurred. One reason for this is that the pieces of event data are stored in memory, for example. Therefore, before the intervals between the pieces of event data are not maintained as they were when the events have occurred, the signal processing section 26 includes, in the event data, the time information indicating relative time when the events have occurred such as time stamps.

Circuit Configuration Examples of Pixel

Next, specific circuit configuration examples of the pixel 21 will be described. The pixel 21 has an event detection function of detecting that change in luminance exceeds or equals the predetermined threshold, as an event.

The pixel 21 detects whether or not an event has occurred, on the basis of whether or not an amount of change in photocurrent exceeds or equals a predetermined threshold. Examples of the event include an ON event and an OFF event. The ON event indicates that an amount of change in photocurrent exceeds or equals an upper limit threshold. The OFF event indicates that the amount of change falls below or equals a lower limit threshold. In addition, the event data (the event information) indicating occurrence of an event includes a bit that indicates a detection result of the ON event and a bit indicating a detection result of the OFF event, for example. Note that, the pixel 21 may also be configured in a manner that the pixel 21 has a function of detecting only the ON event, or in a manner that the pixel 21 has a function of detecting only the OFF event.

Circuit Configuration Example 1

Figure 7:
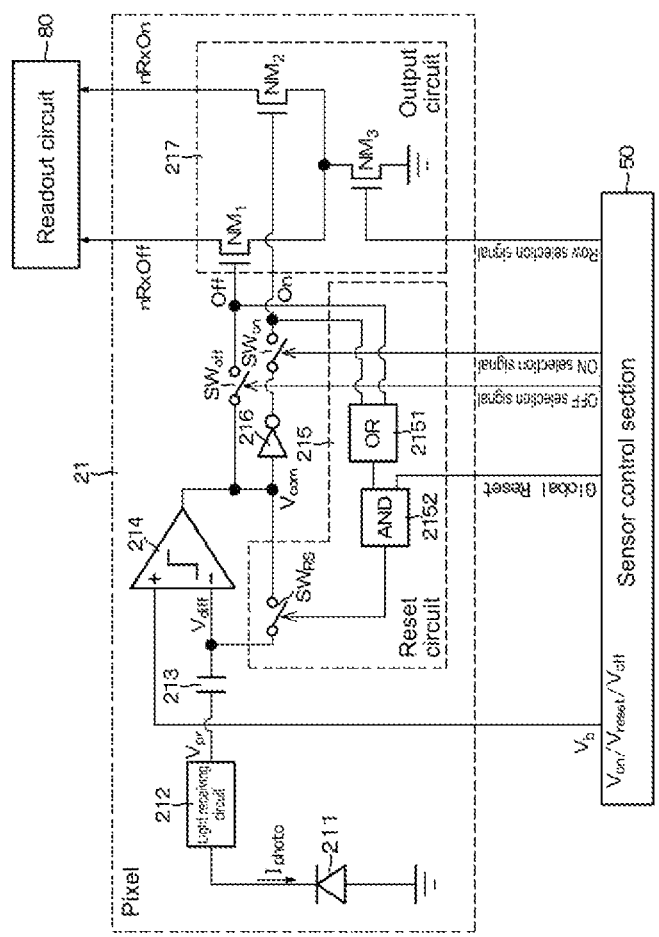
FIG. 7 is a circuit diagram illustrating a circuit configuration of a pixel according to a circuit configuration example 1.

The circuit configuration example 1 is an example of detecting the ON event and the OFF event in the time-sharing manner by using a single comparator. FIG. 7 illustrates a circuit diagram of the pixel 21 according to the circuit configuration example 1. The pixel 21 according to the circuit configuration example 1 has a circuit configuration including a light receiving element 211, a light receiving circuit 212, a memory capacitance 213, a comparator 214, a reset circuit 215, an inverter 216, and an output circuit 217. The pixel 21 detects the ON event and the OFF event under the control of the sensor control section 50.

A first electrode (an anode electrode) of the light receiving element 211 is connected to an input port of the light receiving circuit 212. A second electrode (a cathode electrode) of the light receiving element 211 is connected to a ground node that is a reference potential node. The light receiving element 211 performs photoelectric conversion on incident light and generates electric charge of an amount of charge corresponding to intensity (an amount) of the light. In addition, the light receiving element 211 coverts the generated electric charge into photocurrent $I_{photo}$.

The light receiving circuit 212 converts the photocurrent $I_{photo}$ into voltage $V_{pr}$. The photocurrent $I_{photo}$ is detected by the light receiving element 211 and corresponds to the intensity (amount) of light. Here, in general, a relationship between the intensity of light and the voltage $V_{pr}$ is a logarithmic relationship. In other words, the light receiving circuit 212 converts the photocurrent $I_{photo}$ into the voltage $V_{pr}$. The photocurrent $I_{photo}$ corresponds to intensity of light emitted to the light receiving surface of the light receiving element 211. The voltage $V_{pr}$ is a logarithmic function. However, the relation between the photocurrent $I_{photo}$ and the voltage $V_{pr}$ is not limited to the logarithmic relationship.

The voltage $V_{pr}$ that corresponds to the photocurrent $I_{photo}$ and that has been output from the light receiving circuit 212 passes through the memory capacitance 213 and becomes an inverting (−) input that is a first input of the comparator 214 as voltage $V_{diff}$. In general, the comparator 214 is implemented by a differential pair transistor. The comparator 214 receives threshold voltage $V_b$ provided by the sensor control section 50 as a non-inverting (+) input that is a second input. In addition, the comparator 214 detects the ON event and the OFF event in the time-sharing manner. In addition, after the detection of the ON event and the OFF event, the reset circuit 215 resets the pixel 21.

In the time-sharing manner, the sensor control section 50 outputs voltage $V_{on}$ as the threshold voltage $V_b$ at a stage of detecting the ON event, outputs voltage $V_{off}$ at a stage of detecting the OFF event, and outputs voltage $V_{reset}$ at a stage of performing a reset. The voltage $V_{reset}$ is set to a value between the voltage $V_{on}$ and the voltage $V_{off}$ and is favorably set to an intermediate value between the voltage $V_{on}$ and the voltage $V_{off}$. Here, the wording "intermediate value" has a connotation of a strict intermediate value and a connotation of a substantial intermediate value. The presence of various variations occurring in design or manufacturing is allowed.

In addition, the sensor control section 50 outputs an ON selection signal to the pixel 21 at the stage of detecting the ON event, outputs an OFF selection signal to the pixel 21 at the stage of detecting the OFF event, and outputs a global reset signal to the pixel 21 at the stage of performing a reset. The ON selection signal is provided as a control signal for a selection switch $SW_{on}$ interposed between the inverter 216 and the output circuit 217. The OFF selection signal is provided as a control signal for a selection switch $SW_{off}$ interposed between the comparator 214 and the output circuit 217.

At the stage of detecting the ON event, the comparator 214 compares the voltage $V_{on}$ with the voltage $V_{diff}$. When the voltage $V_{diff}$ exceeds or equals the voltage $V_{on}$, the comparator 214 outputs ON event information On as a comparison result. The ON event information On indicates that an amount of change in the photocurrent $I_{photo}$ exceeds or equals the upper limit value. The ON event information On is inverted by the inverter 216, passes through the selection switch $SW_{on}$, and is supplied to the output circuit 217.

At the stage of detecting the OFF event, the comparator 214 compares the voltage $V_{off}$ with the voltage $V_{diff}$. When the voltage $V_{diff}$ falls below the voltage $V_{off}$, the comparator 214 outputs OFF event information Off as a comparison result. The OFF event information Off indicates that an amount of change in the photocurrent $I_{photo}$ falls below the lower limit value. The OFF event information Off passes through the selection switch $SW_{off}$ and is supplied to the output circuit 217.

The reset circuit 215 includes a reset switch $SW_{RS}$, a two-input OR gate 2151, and a two-input AND gate 2152. The reset switch $SW_{RS}$ is connected between an inverting (−) input terminal and an output terminal of the comparator 214. When the reset switch $SW_{RS}$ is turned on (closed), the reset switch $SW_{RS}$ selectively causes a short-circuit between the inverting input terminal and the output terminal.

The OR gate 2151 receives the ON event information On that has passed through the selection switch $SW_{on}$ and the OFF event information Off that has passed through the selection switch $SW_{off}$ as two inputs. The AND gate 2152 receives an output signal from the OR fate 2151 as one input, receives a global reset signal provided by the sensor control section 50 as another input, and detects one of the ON event information On and the OFF event information Off. When the global reset signal is in an active state, the AND gate 2152 turns on (closes) the reset switch $SW_{RS}$.

As described above, when the output signal from the AND gate 2152 becomes the active state, the reset switch $SW_{RS}$ causes the short-circuit between the inverting input terminal and the output terminal of the comparator 214 and performs a global reset on the pixel 21. This makes it possible to perform reset operation with regard to only pixels 21 in which an event is detected.

The output circuit 217 includes an OFF event output transistor $NM_1$, an ON event output transistor $NM_2$, and an electric current source transistor $NM_3$. The OFF event output transistor $NM_1$ includes memory (not illustrated) for storing the OFF event information Off in its gate. The memory is implemented by a gate parasitic capacitance of the OFF event output transistor $NM_1$.

In a way similar to the OFF event output transistor, the ON event output transistor $NM_2$ includes memory (not illustrated) for storing the ON event information On in its gate. The memory is implemented by a gate parasitic capacitance of the ON event output transistor $NM_2$.

At a stage of readout, the OFF event information Off stored in the memory of the OFF event output transistor $NM_1$ and the ON event information On stored in the memory of the ON event output transistor $NM_2$ are transferred to a readout circuit 80 via an output line nRxOff and an output line nRxOn for each pixel row in the pixel array section 22 when the sensor control section 50 provides a row selection signal to a gate electrode of the electric current source transistor $NM_3$. The readout circuit 80 may be a circuit installed in the signal processing section 26 (see FIG. 6), for example.

As described above, the pixel 21 is configured according to the circuit configuration example 1 in a manner that the pixel 21 has the event detection function of detecting the ON event and the OFF event in the time-sharing manner by using the single comparator 214 under the control of the sensor control section 50.

Circuit Configuration Example 2

Figure 8:
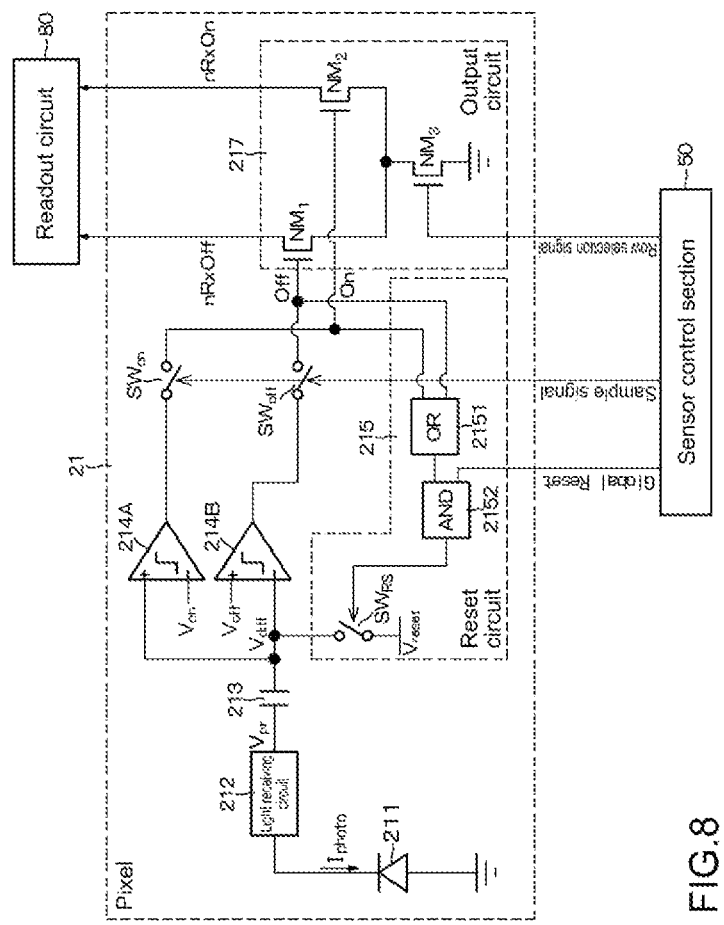
FIG. 8 is a circuit diagram illustrating a circuit configuration of a pixel according to a circuit configuration example 2.

The circuit configuration example 2 is an example of detecting the ON event and the OFF event in parallel (at same time) by using two comparators. FIG. 8 illustrates a circuit diagram of the pixel 21 according to the circuit configuration example 2.

As illustrated in FIG. 8, a pixel 21 according to the circuit configuration example 2 is configured in a manner that the pixel 21 includes a comparator 214A for detecting the ON event and a comparator 214B for detecting the OFF event. It is possible to execute ON event detection operation and OFF event detection operation in parallel when using the two comparators 214A and 214B to detect events as described above. As a result, it is possible to execute the ON event detection operation and the OFF event detection operation more quickly.

In general, the comparator 214A for detecting the ON event is implemented by a differential pair transistor. The comparator 214A receives voltage $V_{diff}$ corresponding to photocurrent $I_{photo}$ as a non-inverting (+) input that is a first input, receives voltage $V_{on}$ serving as threshold voltage $V_b$ as an inverting (−) input that is a second input, and outputs the ON event information On as a comparison result between the non-inverting (+) input and the inverting (−) input. In general, the comparator 214B for detecting the OFF event is also implemented by a differential pair transistor.

The comparator 214B receives voltage $V_{diff}$ corresponding to photocurrent $I_{photo}$ as an inverting input that is a first input, receives voltage $V_{off}$ serving as threshold voltage $V_b$ as a non-inverting input that is a second input, and outputs the OFF event information Off as a comparison result between the inverting input and the non-inverting input.

The selection switch $SW_{on}$ is connected between an output terminal of the comparator 214A and the gate electrode of the ON event output transistor $NM_2$ of the output circuit 217. The selection switch $SW_{off}$ is connected between an output terminal of the comparator 214B and the gate electrode of the OFF event output transistor $NM_1$ of the output circuit 217. The selection switch $SW_{on}$ and the selection switch $SW_{off}$ are controlled to turn on (close)/turn off (open) by a sample signal output from the sensor control section 50.

The ON event information On that is a comparison result of the comparator 214A is stored in the memory of the gate of the ON event output transistor $NM_2$ via the selection switch $SW_{on}$. The memory for storing the ON event information On is implemented by the gate parasitic capacitance of the ON event output transistor $NM_2$. The OFF event information Off that is a comparison result of the comparator 214B is stored in the memory of the gate of the OFF event output transistor $NM_1$ via the selection switch $SW_{off}$. The memory for storing the OFF event Off is implemented by the gate parasitic capacitance of the OFF event output transistor $NM_1$.

The ON event information On stored in the memory of the ON event output transistor $NM_2$ and the OFF event information Off stored in the memory of the OFF event output transistor $NM_1$ are transferred to the readout circuit 80 via the output line nRxOn and the output line nRxOff for each pixel row in the pixel array section 22 when the sensor control section 50 provides a row selection signal to the gate electrode of the electric current source transistor $NM_3$.

As described above, the pixel 21 is configured according to the circuit configuration example 2 in a manner that the pixel 21 has the event detection function of detecting the ON event and the OFF event in parallel (at same time) by using the two comparators 214A and 214B under the control of the sensor control section 50.

Circuit Configuration Example 3

Figure 9:
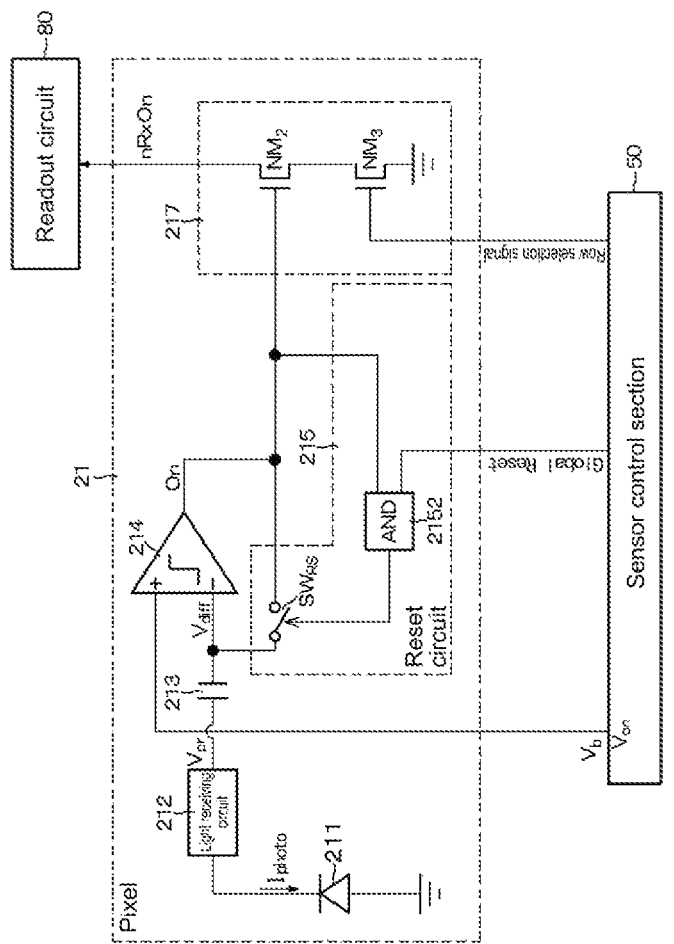
FIG. 9 is a circuit diagram illustrating a circuit configuration of a pixel according to a circuit configuration example 3.

The circuit configuration example 3 is an example of detecting only the ON event. FIG. 9 illustrates a circuit diagram of the pixel 21 according to the circuit configuration example 3.

The pixel 21 according to the circuit configuration example 3 includes a single comparator 214. The comparator 214 receives voltage $V_{diff}$ corresponding to photocurrent $I_{photo}$ as an inverting (−) input that is a first input, receives voltage $V_{on}$ provided as threshold voltage $V_b$ by the sensor control section 50 as a non-inverting (+) input that is a second input, compares the inverting (−) input and the non-inverting (+) input, and outputs ON event information On as a comparison result. Here, an n-type transistor is used as a differential pair transistor for implementing the comparator 214. This makes it possible to omit the inverter 216 used in the circuit configuration example 1 (see FIG. 7).

The ON event information On that is the comparison result of the comparator 214 is stored in the memory of the gate of the ON event output transistor $NM_2$. The memory for storing the ON event information On is implemented by a gate parasitic capacitance of the ON event output transistor $NM_2$. The ON event information On stored in the memory of the ON event output transistor $NM_2$ is transferred to the readout circuit 80 via the output line nRxOn for each pixel row in the pixel array section 22 when the sensor control section 50 provides a row selection signal to the gate electrode of the electric current source transistor $NM_3$.

As described above, the pixel 21 is configured according to the circuit configuration example 3 in a manner that the pixel 21 has the event detection function of detecting only the ON event by using the single comparator 214 under the control of the sensor control section 50.

Circuit Configuration Example 4

Figure 10:
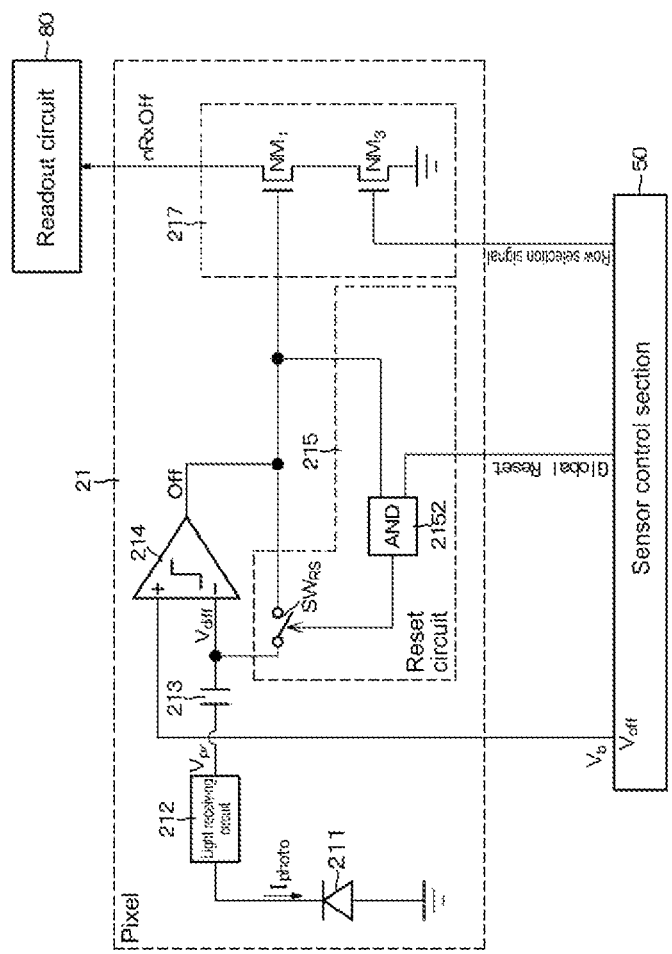
FIG. 10 is a circuit diagram illustrating a circuit configuration of a pixel according to a circuit configuration example 4.

The circuit configuration example 4 is an example of detecting only the OFF event. FIG. 10 illustrates a circuit diagram of the pixel 21 according to the circuit configuration example 4.

The pixel 21 according to the circuit configuration example 4 includes a single comparator 214. The comparator 214 receives voltage $V_{diff}$ corresponding to photocurrent $I_{photo}$ as an inverting (−) input that is a first input, receives voltage $V_{off}$ provided as threshold voltage $V_b$ by the sensor control section 50 as a non-inverting (+) input that is a second input, compares the inverting (−) input and the non-inverting (+) input, and outputs OFF event information Off as a comparison result. A p-type transistor can be used as a differential pair transistor for implementing the comparator 214.

The OFF event information Off that is the comparison result of the comparator 214 is stored in the memory of the gate of the OFF event output transistor $NM_1$. The memory for storing the OFF event Off is implemented by a gate parasitic capacitance of the OFF event output transistor $NM_1$. The OFF event information Off stored in the memory of the OFF event output transistor $NM_1$ is transferred to the readout circuit 80 via the output line nRxOff for each pixel row in the pixel array section 22 when the sensor control section 50 provides a row selection signal to the gate electrode of the electric current source transistor $NM_3$.

As described above, the pixel 21 is configured according to the circuit configuration example 4 in a manner that the pixel 21 has the event detection function of detecting only the OFF event information Off by using the single comparator 214 under the control of the sensor control section 50. Note that, although the reset switch $SW_{RS}$ is controlled by an output signal from the AND gate 2152 according to the circuit configuration illustrated in FIG. 10, it is also possible to directly control the reset switch $SW_{RS}$ by a global reset signal.

(Synchronization Control of Vertical-Cavity Surface-Emitting Laser and Event Detection Sensor)

In the present embodiment, the vertical-cavity surface-emitting laser 10 and the event detection sensor 20 are controlled in synchronization with each other under the control of the system control section 30 in the ranging system 1 that uses the event detection sensor 20 including the pixels 21 configured according to the circuit configuration example 1, circuit configuration example 2, circuit configuration example 3, or circuit configuration example 4 described above.

By controlling the vertical-cavity surface-emitting laser 10 and the event detection sensor 20 in synchronization with each other, it is possible to output event information resulting from movement of a subject without including event information resulting from the other causes therein. Examples of the event information other than the event information resulting from the movement of the subject may include event information resulting from background light or change in a pattern projected on the subject. By outputting the event information resulting from the movement of the subject without including event information resulting from the other causes therein, it is possible to surely acquire the event information resulting from the movement of the subject, and it is possible to omit processing performed by the application processor that process the event information to separate mixed pieces of event information.

Next, specific Examples for controlling the vertical-cavity surface-emitting laser 10 and the event detection sensor 20 under the control of the system control section 30 will be described. The synchronization control is performed by the light source driving section 40 and the sensor control section 50 under the control of the system control section 30 illustrated in FIG. 1B. In other words, it can be said that the wording "control section" described in the embodiments of the present disclosure means the light source driving section 40 and the sensor control section 50 that operate under the control of the system control section 30.

Example 1

Figure 11:
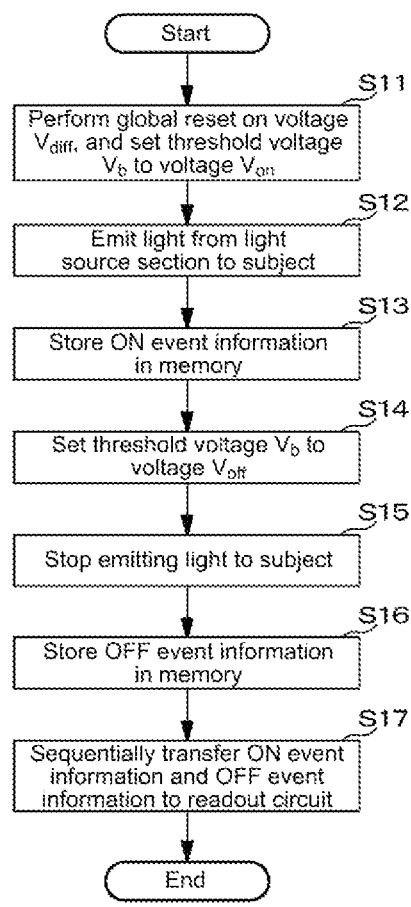
FIG. 11 is a flowchart illustrating flow of synchronization control processing according to Example 1.

Example 1 is a synchronization control example used in the case where pixels 21 are configured according to the circuit configuration example 1 (in other words, an example of detecting the ON event and the OFF event in the time-sharing manner by using the single comparator). FIG. 11 illustrates a flowchart of synchronization control processing according to Example 1. The flowchart illustrated in FIG. 11 may be performed, for example, with a system comprising an image sensor configured to output an image signal, a light source, such as a vertical-cavity surface-emitting laser 10, configured to emit a light, and an event based vision sensor configured to output an event signal. The event based vision sensor may include a plurality of pixels and a comparator 214. One or more of the plurality of pixels may include a photosensor configured to detect incident light and first circuitry configured to output a first signal based on an output from the photosensor. The first signal may indicate a change of amount of incident light. The comparator 214 may be configured to output a comparison result based on the first signal and at least one of a first reference voltage and a second reference voltage. A system controller or sensor control section 50 may be configured to control the event based vision sensor and the light source synchronously. A processor may be configured to process the image signal and the event signal. A system controller may apply the first reference voltage and the second reference voltage to the comparator selectively based on an operation of the light source.

The sensor control section 50 performs a global reset on voltage $V_{diff}$ that is an inverting input of the comparator 214 and sets threshold voltage $V_b$ that is a non-inverting input of the comparator 214 to voltage $V_{on}$ for detecting an ON event (Step S11).

The global reset of the voltage $V_{diff}$ may be performed after event information is transferred to the readout circuit 80. Note that, the global reset of the voltage $V_{diff}$ is performed by turning on (closing) the reset switch $SW_{RS}$ in the reset circuit 215 illustrated in FIG. 7. The same applies to various Examples described below.

Next, the vertical-cavity surface-emitting laser 10 that is the light source section emits light of a predefined pattern to a subject (measurement target) (Step S12). The vertical-cavity surface-emitting laser 10 is driven by the light source driving section 40 under the control of the system control section 30. The same applies to other Examples described below.

Next, the sensor control section 50 stores the ON event information On that is a comparison result of the comparator 214 in the memory (Step S13). Here, the memory for storing the ON event information On is the gate parasitic capacitance of the ON event output transistor $NM_2$ in the output circuit 217.

Next, the sensor control section 50 sets threshold voltage $V_b$ to voltage $V_{of}$ for detecting the OFF event (Step S14). Next, the light source driving section 40 stops emitting the light to the subject (Step S15). Next, the sensor control section 50 stores the OFF event information Off that is a comparison result of the comparator 214 in the memory (Step S16). Here, the memory for storing the OFF event information Off is the gate parasitic capacitance of the OFF event output transistor $NM_1$ in the output circuit 217.

Subsequently, the sensor control section 50 sequentially transfers the ON event information On stored in the gate parasitic capacitance of the ON event output transistor $NM_2$ and the OFF event information Off stored in the gate parasitic capacitance of the OFF event output transistor $NM_1$ to the readout circuit 80 (Step S17), and ends the series of processing for the synchronization control.

Example 2

Figure 12:
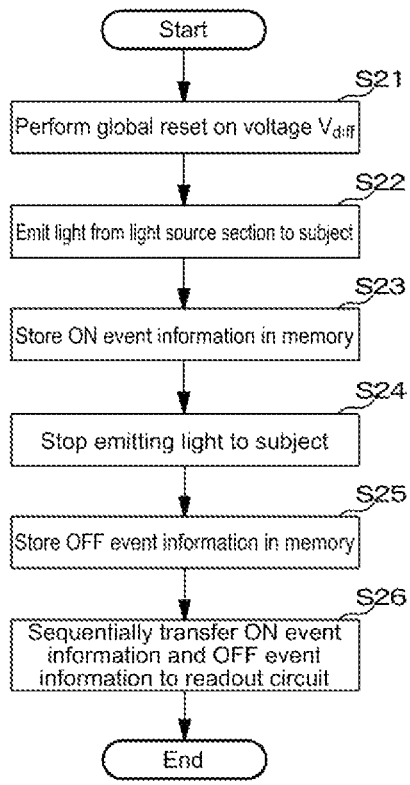
FIG. 12 is a flowchart illustrating flow of synchronization control processing according to Example 2.

Example 2 is a synchronization control example used in the case where pixels 21 are configured according to the circuit configuration example 2 (in other words, an example of detecting the ON event and the OFF event in parallel by using the two comparators). FIG. 12 illustrates a flowchart of synchronization control processing according to Example 2.

The sensor control section 50 performs a global reset on voltage $V_{diff}$ that is an inverting input of the comparator 214 (Step S21). Next, the light source driving section 40 causes the vertical-cavity surface-emitting laser 10 that is the light source section to emit light of a predefined pattern to a subject (Step S22).

Next, the sensor control section 50 stores the ON event information On that is a comparison result of the comparator 214 in the memory (Step S23). Here, the memory for storing the ON event information On is the gate parasitic capacitance of the ON event output transistor $NM_2$ in the output circuit 217.

Next, the light source driving section 40 stops emitting the light to the subject (Step S24). Next, the sensor control section 50 stores the OFF event information Off that is a comparison result of the comparator 214 in the memory (Step S25). Here, the memory for storing the OFF event information Off is the gate parasitic capacitance of the OFF event output transistor $NM_1$ in the output circuit 217.

Subsequently, the sensor control section 50 sequentially transfers the ON event information On stored in the gate parasitic capacitance of the ON event output transistor $NM_2$ and the OFF event information Off stored in the gate parasitic capacitance of the OFF event output transistor $NM_1$ to the readout circuit 80 (Step S26), and ends the series of processing for the synchronization control.

Example 3

Figure 13:
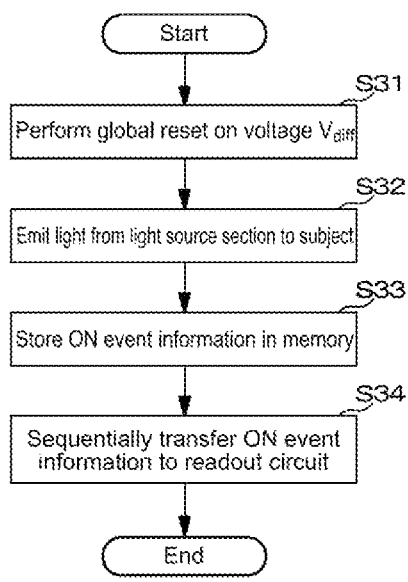
FIG. 13 is a flowchart illustrating flow of synchronization control processing according to Example 3.

Example 3 is a synchronization control example used in the case where pixels 21 are configured according to the circuit configuration example 3 (in other words, an example of detecting only the ON event by using the single comparator). FIG. 13 illustrates a flowchart of synchronization control processing according to Example 3.

The sensor control section 50 performs a global reset on voltage $V_{diff}$ that is an inverting input of the comparator 214 (Step S31). Next, the light source driving section 40 causes the vertical-cavity surface-emitting laser 10 that is the light source section to emit light of a predefined pattern to a subject (Step S32).

Next, the sensor control section 50 stores the ON event information On that is a comparison result of the comparator 214 in the memory (Step S33). Here, the memory for storing the ON event information On is the gate parasitic capacitance of the ON event output transistor $NM_2$ in the output circuit 217. Subsequently, the sensor control section 50 sequentially transfers the ON event information On stored in the gate parasitic capacitance of the ON event output transistor $NM_2$ to the readout circuit 80 (Step S34) and ends the series of processing for the synchronization control.

Example 4

Figure 14:
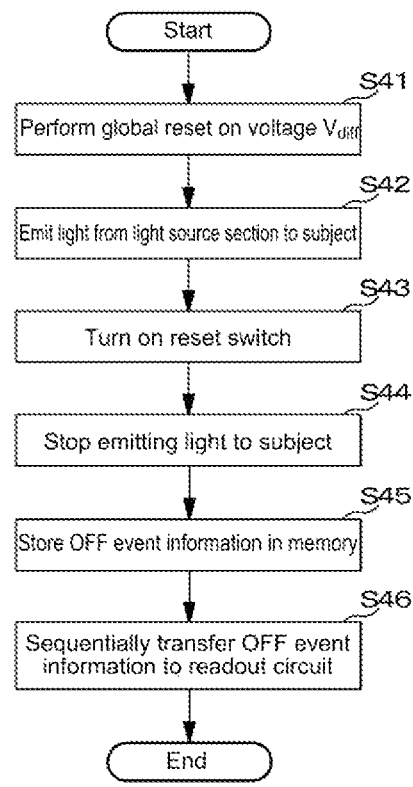
FIG. 14 is a flowchart illustrating flow of synchronization control processing according to Example 4.

Example 4 is a synchronization control example used in the case where pixels 21 are configured according to the circuit configuration example 4 (in other words, an example of detecting only the OFF event by using the single comparator). FIG. 14 illustrates a flowchart of synchronization control processing according to Example 4.

The sensor control section 50 performs a global reset on voltage $V_{diff}$ that is an inverting input of the comparator 214 (Step S41). Next, the light source driving section 40 causes the vertical-cavity surface-emitting laser 10 that is the light source section to emit light of a predefined pattern to a subject (Step S42).

Next, the sensor control section 50 turns on the reset switch $SW_{RS}$ (Step S43). Next, the light source driving section 40 stops emitting the light to the subject (Step S44). Next, the sensor control section 50 stores the OFF event information Off that is a comparison result of the comparator 214 in the memory (Step S45). Here, the memory for storing the OFF event information Off is the gate parasitic capacitance of the OFF event output transistor $NM_1$ in the output circuit 217.

Subsequently, the sensor control section 50 sequentially transfers the OFF event information Off stored in the gate parasitic capacitance of the OFF event output transistor $NM_1$ to the readout circuit 80 (Step S46) and ends the series of processing for the synchronization control.

Example 5

Example 5 is a pixel arrangement example used in the case where the pixel array section 22 includes both the ON pixels and the OFF pixels. Here, the "ON pixel" is a pixel 21 configured according to the circuit configuration example 3, that is, a first pixel having the function of detecting only the ON event. In addition, the "OFF pixel" is a pixel 21 configured according to the circuit configuration example 4, that is, a second pixel having the function of detecting only the OFF event.

Figure 15A:
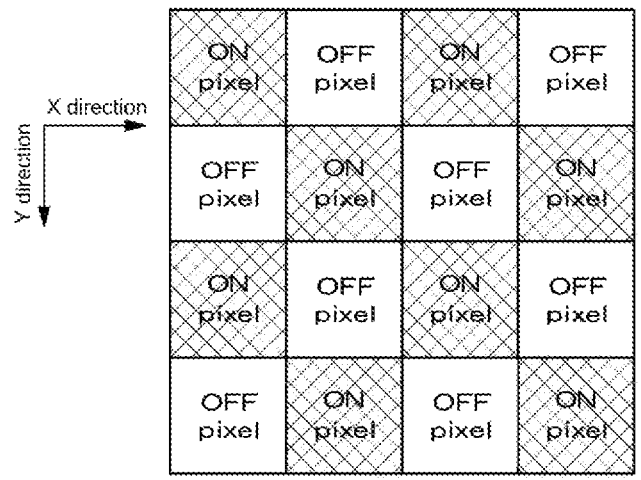
FIG. 15A and FIG. 15B are diagrams illustrating pixel arrangement examples (part 1) of ON pixels and OFF pixels according to Example 5.
Figure 15B:
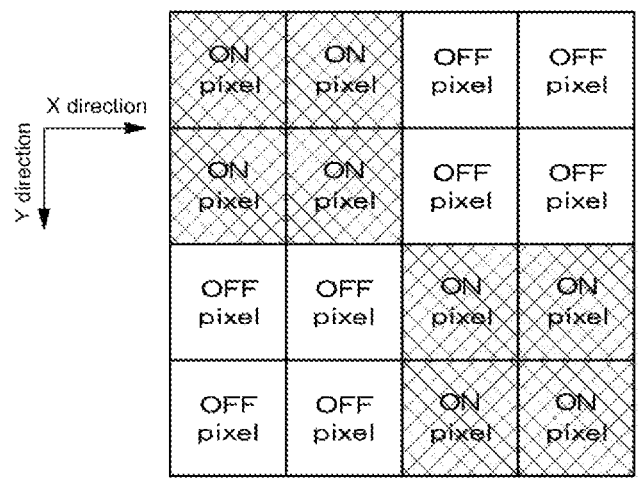
Figure 16A:
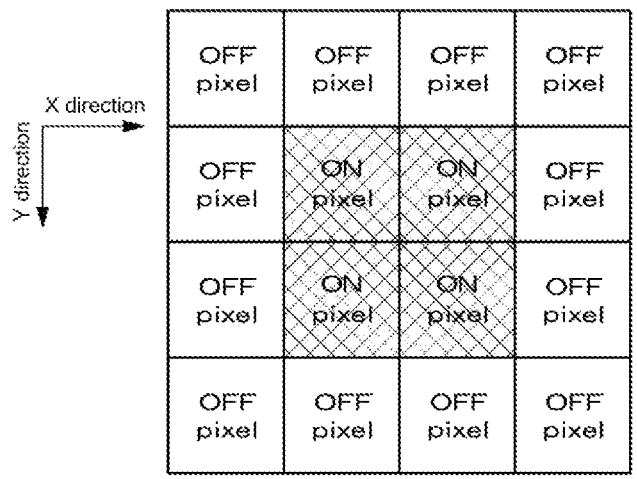
FIG. 16A and FIG. 16B are diagrams illustrating pixel arrangement examples (part 2) of ON pixels and OFF pixels according to Example 5.
Figure 16B:
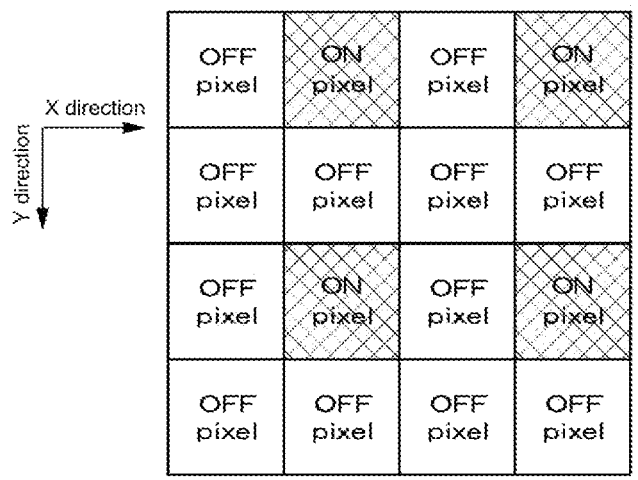

FIG. 15A and FIG. 5B illustrate pixel arrangement examples (part 1) of the ON pixels and the OFF pixels according to Example 5. FIG. 16A and FIG. 16B illustrate pixel arrangement examples (part 2). Here, to simplify the drawing, FIGS. 15A to 16B illustrate pixel arrangement (pixel array) of 16 pixels including four pixels in each row in an X direction (a row direction/horizontal direction) and four pixels in each column in a Y direction (a column direction/vertical direction).

According to the pixel arrangement illustrated in FIG. 15A, the ON pixels and the OFF pixels are alternately arranged in the X direction and the Y direction. According to the pixel arrangement illustrated in FIG. 15B, four pixels (two pixels in the X direction×two pixels in the Y direction) forms a block (a unit), and blocks of the ON pixels and blocks of the OFF pixels are alternately arranged in the X direction and the Y direction.

According to the pixel arrangement illustrated in FIG. 16A, center four pixels among 16 pixels are ON pixels, and 12 pixels around the ON pixels are OFF pixels. According to the pixel arrangement illustrated in FIG. 16B, each pixel arranged in odd columns and even rows among 16 pixels is the ON pixel, and the other pixels are the OFF pixels.

Note that, the pixel arrangements of the ON pixels and the OFF pixels exemplified above are mere examples. The present disclosure is not limited thereto.

Example 6

Figure 17:
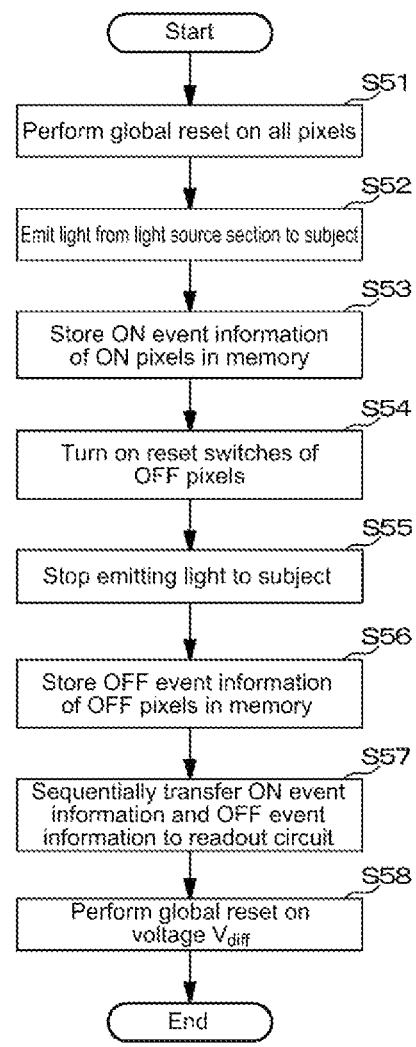
FIG. 17 is a flowchart illustrating flow of synchronization control processing according to Example 6.

Example 6 is a synchronization control example (part 1) used in the case of Example 5, that is, the synchronization control example (part 1) used in the case of pixel arrangement in which the pixel array section 22 includes both the ON pixels and the OFF pixels. FIG. 17 illustrates a flowchart of synchronization control processing according to Example 6.

The sensor control section 50 first performs a global reset on all pixels including the ON pixels and the OFF pixels (Step S51). Next, the light source driving section 40 causes the vertical-cavity surface-emitting laser 10 that is the light source section to emit light of a predefined pattern to a subject (Step S52). Next, the sensor control section 50 stores, in the memory, the ON event information On detected by the ON pixels (Step S53). Here, the memory for storing the ON event information On is the gate parasitic capacitance of the ON event output transistor $NM_2$ in the output circuit 217.

Next, the sensor control section 50 turns on the reset switches $SW_{RS}$ of the OFF pixels (Step S54). Next, the light source driving section 40 stops emitting the light to the subject (Step S55). Next, the sensor control section 50 stores, in the memory, the OFF event information Off detected by the OFF pixels (Step S56). Here, the memory for storing the OFF event information Off is the gate parasitic capacitance of the OFF event output transistor $NM_1$ in the output circuit 217.

Subsequently, the sensor control section 50 sequentially transfers the ON event information On and the OFF event information Off to the readout circuit 80 (Step S57). Next, the sensor control section 50 performs a global reset on the voltage $V_{diff}$ that is an inverting input of the comparator 214 in the pixels subjected to the event detection (step S58). Next, the sensor control section 50 ends the series of processing for the synchronization control.

Example 7

Figure 18:
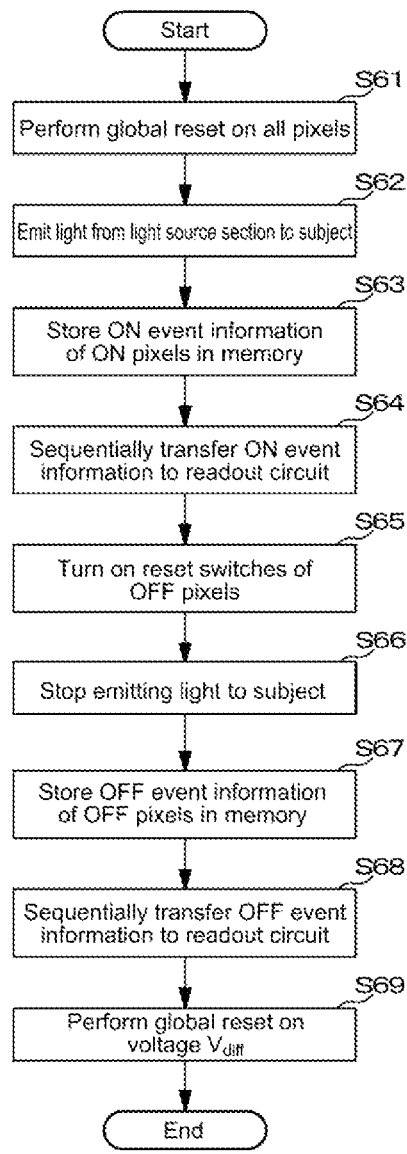
FIG. 18 is a flowchart illustrating flow of synchronization control processing according to Example 7.

Example 7 is a synchronization control example (part 2) used in the case of Example 5, that is, the synchronization control example (part 2) used in the case of pixel arrangement in which the pixel array section 22 includes both the ON pixels and the OFF pixels. FIG. 18 illustrates a flowchart of synchronization control processing according to Example 7.

The sensor control section 50 first performs a global reset on all pixels including the ON pixels and the OFF pixels (Step S61). Next, the light source driving section 40 causes the vertical-cavity surface-emitting laser 10 that is the light source section to emit light of a predefined pattern to a subject (Step S62). Next, the sensor control section 50 stores, in the memory, the ON event information On detected by the ON pixels (Step S63). Here, the memory for storing the ON event information On is the gate parasitic capacitance of the ON event output transistor $NM_2$ in the output circuit 217.

Next, the sensor control section 50 sequentially transfers the ON event information On stored in the gate parasitic capacitance of the ON event output transistor $NM_2$ in the output circuit 217 to the readout circuit 80 (Step S64) and turns on the reset switches $SW_{RS}$ of the OFF pixels (Step S65).

Next, the light source driving section 40 stops emitting the light to the subject (Step S66). Next, the sensor control section 50 stores, in the memory, the OFF event information Off detected by the OFF pixels (Step S67). Here, the memory for storing the OFF event information Off is the gate parasitic capacitance of the OFF event output transistor $NM_1$ in the output circuit 217.

Subsequently, the sensor control section 50 sequentially transfers the ON event information On and the OFF event information Off to the readout circuit 80 (Step S68). Next, the sensor control section 50 performs a global reset on the voltage $V_{diff}$ that is an inverting input of the comparator 214 in the pixels subjected to the event detection (step S69). Next, the sensor control section 510 ends the series of processing for the synchronization control.

Example 8

Figure 19:
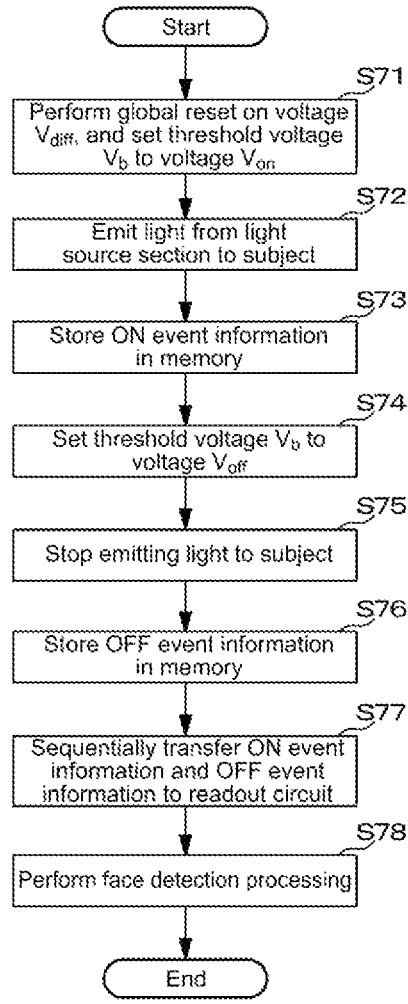
FIG. 19 is a flowchart illustrating flow of synchronization control processing according to Example 8.

Example 8 is an example of applying the ranging system 1 according to the present embodiments to facial recognition. For example, in Example 8, a case of using the circuit configuration example 1 and performing face detection processing for facial recognition under the synchronization control will be described. FIG. 19 illustrates a flowchart of synchronization control processing according to Example 8.

The sensor control section 50 performs a global reset on voltage $V_{diff}$ that is an inverting input of the comparator 214 and sets threshold voltage $V_b$ that is a non-inverting input of the comparator 214 to voltage $V_{on}$ for detecting the ON event (Step S71).

Next, the light source driving section 40 causes the vertical-cavity surface-emitting laser 10 that is the light source section to emit light of a predefined pattern to a subject (a measurement target) (Step S72). Next, the sensor control section 50 stores the ON event information On that is a comparison result of the comparator 214 in the memory (Step S73). Here, the memory for storing the ON event information On is the gate parasitic capacitance of the ON event output transistor $NM_2$ in the output circuit 217.

Next, the sensor control section 50 sets the threshold voltage $V_b$ to voltage $V_{off}$ for detecting the OFF event (Step S74). Next, the light source driving section 40 stops emitting the light to the subject (Step S75). Next, the sensor control section 50 stores the OFF event information Off that is the comparison result of the comparator 214 in the memory (Step S76). Here, the memory for storing the OFF event information Off is the gate parasitic capacitance of the OFF event output transistor $NM_1$ in the output circuit 217.

Next, the sensor control section 50 sequentially transfers the ON event information On stored in the gate parasitic capacitance of the ON event output transistor $NM_2$ and the OFF event information Off stored in the gate parasitic capacitance of the OFF event output transistor $NM_1$ to the readout circuit 80 (Step S77).

The ON event information On and the OFF event information Off that have been sequentially transferred to the readout circuit 80, that is, pieces of event information detected by the event detection sensor 20 are supplied to the application processor 200 illustrated in FIG. 1B. The application processor 200 performs face detection processing for facial recognition on the basis of the ON event information On and the OFF event information Off (Step S78).

Example 9

Example 9 is a modification of the ranging system 1 according to the present embodiments. Example 9 is an example in which the ranging system 1 includes an imaging section (hereinafter, referred to as an "RGB camera") in addition to the event detection sensor 20. The imaging section includes an image sensor such as a CMOS image sensor, and each pixel includes respective color filters such as a red (R) filter, a green (G) filter, and a blue (B) filter, for example.

Figure 20:
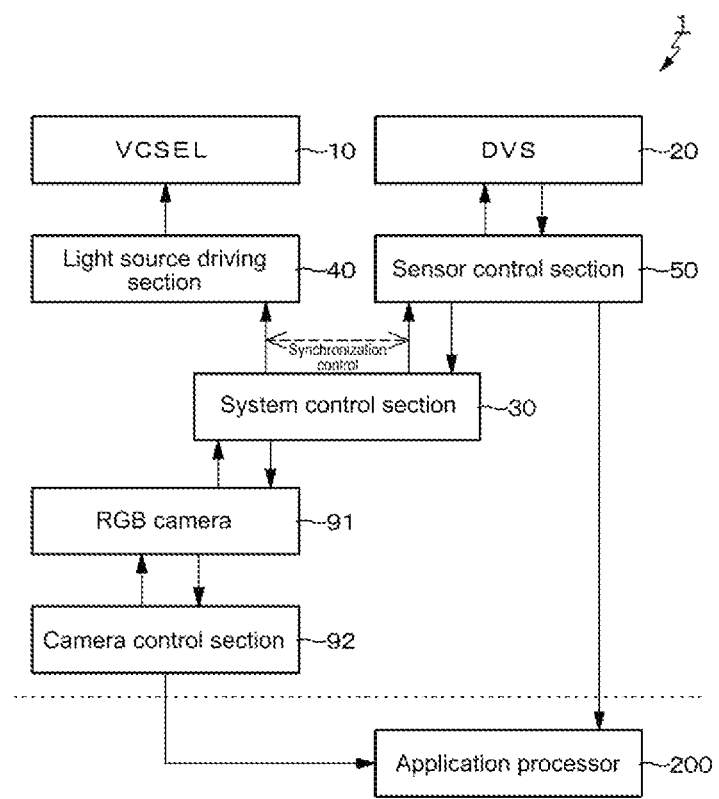
FIG. 20 is a block diagram illustrating an example of a circuit configuration of a ranging system according to Example 9.

FIG. 20 is a block diagram illustrating an example of a circuit configuration of a ranging system according to Example 9. As illustrated in FIG. 20, a ranging system 1 according to the modification of the present embodiment includes an RGB camera 91 and a camera control section 92 for controlling the RGB camera 91 in addition to the event detection sensor 20. Under the control of the system control section 30, the RGB camera 91 acquires image information of a subject detected by the event detection sensor 20, supplies the acquired image information to the system control section 30, and supplies the acquired image information to the system control section 30, and supplies the image information to the application processor 200 via the camera control section 92.

The imaging section used as the RGB camera is a synchronous imaging apparatus that captures images at a predetermined frame rate and has better resolution than the event detection sensor 20. Therefore, the ranging system 1 according to the modification of the present embodiment makes it possible to use the RGB camera 91 and acquire image information of a region including an event at higher resolution than the event detection sensor 20. As a result, it is possible to more accurately recognize an object of the event such as a face of a predetermined user on the basis of the image information of the region including the event acquired through image capturing performed by the RGB camera 91.

Note that, the event detection sensor 20 inevitably has a larger pixel size than the RGB camera 91 implemented by the synchronous imaging apparatus because the pixel 21 has a circuit configuration according to the circuit configuration example illustrated in FIG. 7, the circuit configuration example 2 illustrated in FIG. 8, the circuit configuration example 3 illustrated in FIG. 9, or the circuit configuration example 4 illustrated in FIG. 10. Therefore, it can be said that the event detection sensor 20 has lower resolution than the RGB camera 91 that captures images at a predetermined frame rate. In other words, it can be said that the RGB camera 91 has better resolution than the event detection sensor 20. In some embodiments, the RGB camera may be integrated into an event based vision sensor as a single chip. In such an embodiment, the sensor may be capable of detecting an event and RGB imaging. The sensor may include a pixel array including one or more pixels which can detect visible light for RGB imaging and one or more pixels which can detect infrared light for an event detection. As an another example, the chip sensor may include a pixel array including one or more pixels which can detect infrared light for event detection and visible light for an RGB imaging.

Example 10

Example 10 is an example of performing facial recognition (facial authentication) by using the ranging system 1 according to the modification of the present embodiment, that is, the combination of the event detection sensor 20 and the RGB camera 91. In this case, the application processor 200 of the ranging system 1 according to Example 9 processes an event signal generated by the event detection sensor 20 and extracts a region of interest on the basis of an image signal from the RGB camera 91 that is the imaging section. In addition, the application processor 200 has a function of acquiring ranging information on the basis of the event signal and performing pattern matching in the region of interest based on the image signal, and a function of performing facial authentication on a user on the basis of the acquired ranging information and the pattern matching.

Figure 21:
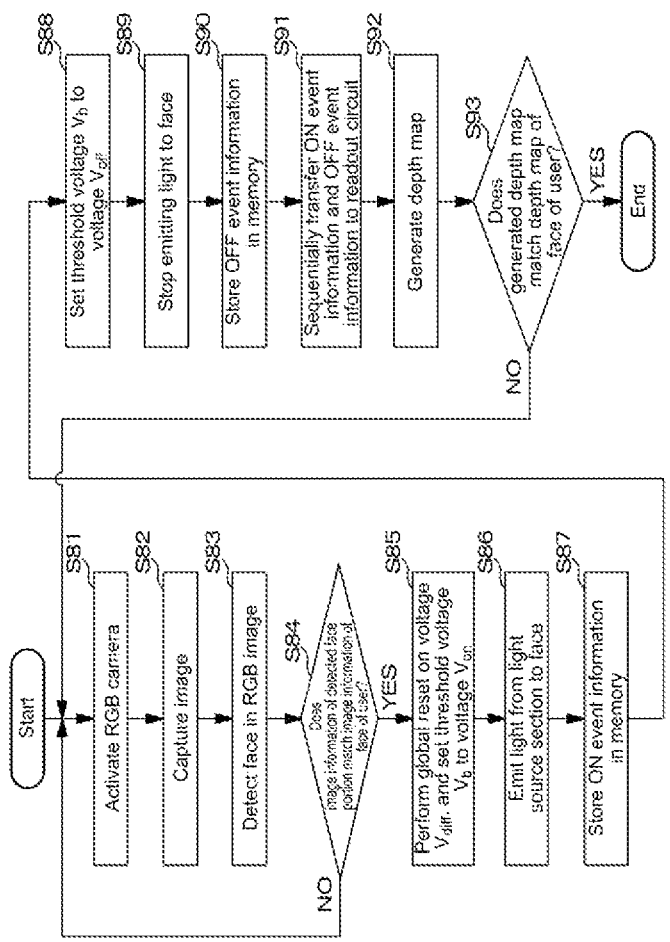
FIG. 21 is a flowchart illustrating flow of facial authentication processing according to Example 10.

FIG. 21 illustrates a flowchart of facial recognition processing according to Example 10. In Example 10, the vertical-cavity surface-emitting laser 10 and the event detection sensor 20 are also controlled in synchronization with each other via the light source driving section 40 and the sensor control section 50 under the control of the system control section 30 in a way similar to the above-described Examples. Note that, the facial recognition processing is performed by the application processor 200.

The system control section 30 first activates the RGB camera 91 (Step S81), and then causes the RGB camera 91 to capture an image (Step S82). Next, the system control section 30 detects a face in the RGB image captured by the RGB camera 91 (Step S83), and then determines whether or not image information of the detected face portion matches image information of the face of the predetermined user (Step S84). The system control section 30 returns to Step S81 in the case where it is determined that they do not match each other (NO in Step S84).

In the case where it is determined that they match each other (YES in Step S84), the system control section 30 uses the sensor control section 50 to perform a global reset on voltage $V_{diff}$ that is an inverting input of the comparator 214, and sets threshold voltage $V_b$ that is a non-inverting input of the comparator 214 to voltage $V_{on}$ for detecting the ON event (Step S85).

Next, the system control section 30 causes the vertical-cavity surface-emitting laser 10 that is the light source section to emit light to the detected face part (Step S86) and stores the ON event information On that is a comparison result of the comparator 214 in the memory (Step S87). Here, the memory for storing the ON event information On is the gate parasitic capacitance of the ON event output transistor $NM_2$ in the output circuit 217.

Next, the system control section 30 sets the threshold voltage $V_b$ to voltage $V_{off}$ for detecting the OFF event (Step S88), and then stops emitting the light to the face part (Step S89). Next, the system control section 30 stores the OFF event information Off that is a comparison result of the comparator 214 in the memory (Step S90). Here, the memory for storing the OFF event information Off is the gate parasitic capacitance of the OFF event output transistor $NM_1$ in the output circuit 217.

Next, the system control section 30 sequentially transfers the ON event information On stored in the gate parasitic capacitance of the ON event output transistor $NM_2$ and the OFF event information Off stored in the gate parasitic capacitance of the OFF event output transistor $NM_1$ to the readout circuit 80 (Step S91).

The ON event information On and the OFF event information Off that have been sequentially transferred to the readout circuit 80, that is, pieces of event information detected by the event detection sensor 20 are supplied to the application processor 200. The application processor 200 generates a depth map for the facial recognition on the basis of the ON event information On and the OFF event information Off (Step S92). Next, the application processor 200 uses the pattern matching function in the region of interest based on the image signal and determines whether or not the generated depth map matches a depth map of the face of the predetermined user (Step S93). The application processor 200 ends the series of processing for the facial recognition in the case where it is determined that they match each other (YES in Step S93). The application processor 200 returns to Step S81 in the case where it is determined that they do not match each other (NO in Step S93).

Modification

The technology according to the present disclosure has been described above on the basis of the favorable embodiments. However, the technology according to the present disclosure is not limited to the embodiments. The configurations and structures of the ranging systems described in the above-described embodiments are merely illustrative and may be appropriately modified.

Application Examples

The above-described ranging systems according to the embodiments and modification of the present disclosure can be used in various cases. Examples of the various cases may include apparatuses and the like listed below.
  An apparatus used for traffic, such as an in-vehicle sensor which captures images of the front, rear, surroundings, inside, and the like of an automobile for safe driving, such as automatic stop, recognition of driver's condition, and the like, a surveillance camera which monitors traveling vehicles and roads, or a ranging sensor which measures a distance between vehicles, or the like.
  An apparatus used for home electronics such as a TV, a refrigerator, or an air conditioner for capturing images of user's gesture to operate the equipment in accordance with that gesture.
  An apparatus used for security, such as a surveillance camera used for crime prevention or a camera for personal authentication application.

Electronic Apparatus According to Embodiment of Present Disclosure

The above-described ranging systems according to the embodiments and the modification of the present disclosure may be used as three-dimensional image acquisition system (facial authentication systems) installed in various electronic apparatuses including the facial authentication function, for example. Examples of the electronic apparatuses including the facial authentication function may include a mobile device such as a smartphone, a tablet, and a personal computer. Note that, the electronic apparatus to which the ranging systems according to the embodiments or the modification of the present disclosure are applicable is not limited to the mobile device.

(Smartphone)

Figure 22:
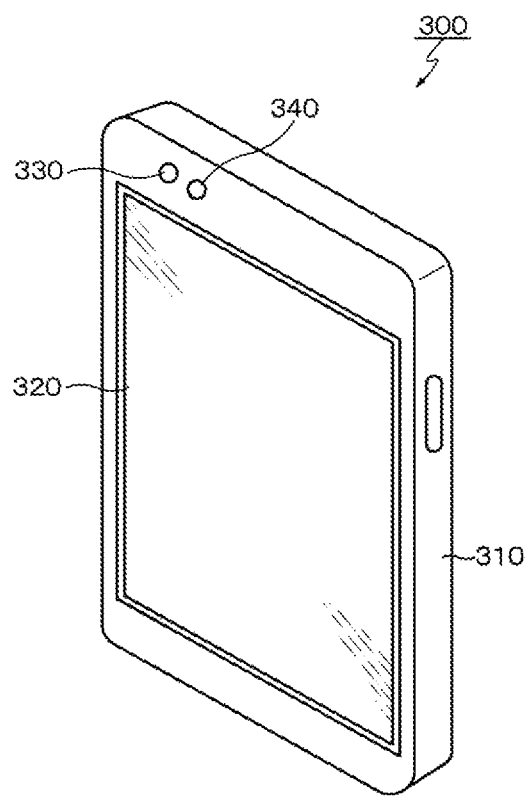
FIG. 22 is an external view of a smartphone according to a specific example of an electronic apparatus according to an embodiment of the present disclosure when viewed from a front side.

Here, a smartphone will be described as a specific example of the electronic apparatus according to an embodiment of the present disclosure to which the ranging systems according to the embodiments or the modification of the present disclosure are applicable. FIG. 22 is an external view of the smartphone according to the specific example of the electronic apparatus according to the embodiment of the present disclosure when viewed from a front side.

A smartphone 300 according to the specific example includes a display section 320 on a front side of a casing 310. In addition, the smartphone 300 includes a light emission section 330 and a light receiving section 340 on an upper front side of the casing 310. Note that, the arrangement example of the light emission section 330 and the light receiving section 340 illustrated in FIG. 22 is a mere example. The arrangement is not limited thereto.

With regard to the smartphone 300 that is configured as described above and serves as an example of the mobile device, it is possible to use the light source (the vertical-cavity surface-emitting laser 10) in the ranging system 1 according to the above-described embodiments as the light emission section 330, and it is possible to use the event detection sensor 20 as the light receiving section 340. In other words, the smartphone 300 according to this specific example is obtained by using the ranging system 1 according to the above-described embodiments as the three-dimensional image acquisition system.

The ranging system 1 according to the above-described embodiments makes it possible to improve resolution of a range image without increasing the number of light sources in the array dot arrangement of the light sources. Therefore, it is possible for the smartphone 300 according to the specific example to have the highly-accurate facial recognition function (facial authentication function) in the case where the ranging system 1 according to the above-described embodiments is used as the three-dimensional image acquisition system (the facial authentication system).

Configuration that Embodiments of Present Disclosure Can Have

Note that, the embodiments of the present disclosure may also be configured as below.

<<A. Ranging System (Part 1)>>

(A-1)
A ranging system including:
a light source section configured to emit light to a subject;
an event detection sensor configured to receive the light reflected by the subject and detect that change in luminance of a pixel exceeds or equals a predetermined threshold, as an event; and
a control section configured to control the light source section and the event detection sensor in synchronization with each other.

(A-2)
The ranging system according to (A-1),
in which the pixel has a function of detecting an ON event and an OFF event in a time-sharing manner by using a single comparator, the ON event indicating that an amount of change in photocurrent exceeds or equals an upper limit threshold, the OFF event indicating that an amount of change in photocurrent falls below or equals a lower limit threshold.

(A-3)
The ranging system according to (A-2),
in which the single comparator receives voltage based on photocurrent as a first input, receives voltage for detecting the ON event and voltage for detecting the OFF event that are given in the time-sharing manner as second inputs, and outputs comparison results between the first input and the second inputs as ON event information and OFF event information.

(A-4)
The ranging system according to (A-3),
in which the control section performs a global reset of the first input of the comparator, sets the second input of the comparator to the voltage for detecting the ON event, emits light from the light source section to the subject, stores the ON event information in memory, sets the second input of the comparator to the voltage for detecting the OFF event, stops emitting the light to the subject, stores the OFF event information in memory, and then sequentially transfers the ON event information and the OFF event information to a readout circuit.

(A-5)
The ranging system according to (A-1),
in which the pixel has a function of detecting an ON event and an OFF event in parallel by using two comparators, the ON event indicating that an amount of change in photocurrent exceeds or equals an upper limit threshold, the OFF event indicating that an amount of change in photocurrent falls below or equals a lower limit threshold.

(A-6)
The ranging system according to (A-5), in which
one of the two comparators receives voltage based on photocurrent as a first input, receives voltage for detecting the ON event as a second input, and outputs a comparison result between the first input and the second input as ON event information, and
another of the two comparators receives voltage based on photocurrent as a first input, receives voltage for detecting the OFF event as a second input, and outputs a comparison result between the first input and the second input as OFF event information.

(A-7)
The ranging system according to (A-6),
in which the control section performs a global reset of the first inputs of the comparators, emits light from the light source section to the subject, stores the ON event information in memory, stops emitting the light to the subject, stores the OFF event information in the memory, and then sequentially transfers the ON event information and the OFF event information to a readout circuit.

(A-8)
The ranging system according to (A-1),
in which the pixel has a function of detecting an ON event by using a single comparator, the ON event indicating that an amount of change in photocurrent exceeds or equals an upper limit threshold.

(A-9)
The ranging system according to (A-8),
in which the single comparator receives voltage based on photocurrent as a first input, receives voltage for detecting the ON event as a second input, and outputs a comparison result between the first input and the second input as ON event information.

(A-10)
The ranging system according to (A-9),
in which the control section performs a global reset of the first input of the comparator, emits light from the light source section to the subject, stores the ON event information in memory, and then sequentially transfers the ON event information to a readout circuit.

(A-11)
The ranging system according to (A-1),
in which the pixel has a function of detecting an OFF event by using a single comparator, the OFF event indicating that an amount of change in photocurrent falls below or equals a lower limit threshold.

(A-12)
The ranging system according to (A-11),
in which the single comparator receives voltage based on photocurrent as a first input, receives voltage for detecting the OFF event as a second input, and outputs a comparison result between the first input and the second input as OFF event information.

(A-13)
The ranging system according to (A-12),
in which the control section performs a global reset of the first input of the comparator, emits light from the light source section to the subject, turns on a reset switch connected between a first input terminal and an output terminal of the comparator, stops emitting the light to the subject, stores the OFF event information in the memory, and then sequentially transfers the OFF event information to a readout circuit.

(A-14)
The ranging system according to (A-1),
in which a pixel array section of the event detection sensor includes both a first pixel and a second pixel, the first pixel having a function of using a comparator and detecting an ON event indicating that an amount of change in photocurrent exceeds or equals an upper limit threshold, the second pixel having a function of using a comparator and detecting an OFF event indicating that an amount of change in photocurrent falls below or equals a lower limit threshold.

(A-15)
The ranging system according to (A-14),
in which the control section first performs a global reset of all pixels including the first pixel and the second pixel, emits light from the light source section to the subject, stores ON event information detected by the first pixel in memory, turns on a reset switch connected between a first input terminal and an output terminal of the comparator of the second pixel, stops emitting the light to the subject, stores OFF event information detected by the second pixel in memory, sequentially transfers the ON event information and the OFF event information to a readout circuit, and then performs the global reset of a first input of the comparator.

(A-16)
The ranging system according to (A-14),
in which the control section first performs a global reset of all pixels including the first pixel and the second pixel, emits light from the light source section to the subject, stores ON event information detected by the first pixel in memory, sequentially transfers the ON event information to a readout circuit, turns on a reset switch connected between a first input terminal and an output terminal of the comparator of the second pixel, stops emitting the light to the subject, stores OFF event information detected by the second pixel in memory, sequentially transfers the OFF event information to the readout circuit, and then performs the global reset of a first input of the comparator.

(A-17)
The ranging system according to any of (A-1) to (A-16),
in which the light source section includes a surface-emitting semiconductor laser.

(A-18)
The ranging system according to (A-17),
in which the surface-emitting semiconductor laser is a vertical-cavity surface-emitting laser.

(A-19)
The ranging system according to (A-18),
in which the vertical-cavity surface-emitting laser projects light of a predetermined pattern onto the subject.

<<B. Ranging System (Part 2)>>

(B-1)
A ranging system including:
a light source section configured to emit light to a subject;
an event detection sensor configured to receive the light reflected by the subject and detect that change in luminance of a pixel exceeds or equals a predetermined threshold, as an event;
an imaging section configured to capture an image of the subject and generate an image signal;
a processor configured to process an event signal generated by the event detection sensor, and extract a region of interest on the basis of the image signal from the imaging section; and
a control section configured to control the light source section and the event detection sensor in synchronization with each other and control the imaging section.

(B-2)
The ranging system according to (B-1),
in which the pixel has a function of detecting an ON event and an OFF event in a time-sharing manner by using a single comparator, the ON event indicating that an amount of change in photocurrent exceeds or equals an upper limit threshold, the OFF event indicating that an amount of change in photocurrent falls below or equals a lower limit threshold.

(B-3)
The ranging system according to (B-2),
in which the single comparator receives voltage based on photocurrent as a first input, receives voltage for detecting the ON event and voltage for detecting the OFF event that are given in the time-sharing manner as second inputs, and outputs comparison results between the first input and the second inputs as ON event information and OFF event information.

(B-4)
The ranging system according to (B-3),
in which the control section performs a global reset of the first input of the comparator, sets the second input of the comparator to the voltage for detecting the ON event, emits light from the light source section to the subject, stores the ON event information in memory, sets the second input of the comparator to the voltage for detecting the OFF event, stops emitting the light to the subject, stores the OFF event information in memory, and then sequentially transfers the ON event information and the OFF event information to a readout circuit.

(B-5)
The ranging system according to (B-3),
in which the processor has a function of acquiring ranging information on the basis of the event signal and performing pattern matching in the region of interest based on the image signal.

(B-6)
The ranging system according to (B-5),
in which the processor has a function of performing facial authentication of a user on the basis of the acquired ranging information and the pattern matching.

<<C. Electronic Apparatus>>

(C-1)
An electronic apparatus including
a ranging system that includes:
a light source section configured to emit light to a subject;
an event detection sensor configured to receive the light reflected by the subject and detect that change in luminance of a pixel exceeds or equals a predetermined threshold, as an event; and
a control section configured to control the light source section and the event detection sensor in synchronization with each other.

(C-2)
The electronic apparatus according to (C-1),
in which the pixel has a function of detecting an ON event and an OFF event in a time-sharing manner by using a single comparator, the ON event indicating that an amount of change in photocurrent exceeds or equals an upper limit threshold, the OFF event indicating that an amount of change in photocurrent falls below or equals a lower limit threshold.

(C-3)
The electronic apparatus according to (C-2),
in which the single comparator receives voltage based on photocurrent as a first input, receives voltage for detecting the ON event and voltage for detecting the OFF event that are given in the time-sharing manner as second inputs, and outputs comparison results between the first input and the second inputs as ON event information and OFF event information.

(C-4)
The electronic apparatus according to (C-3),
in which the control section performs a global reset of the first input of the comparator, sets the second input of the comparator to the voltage for detecting the ON event, emits light from the light source section to the subject, stores the ON event information in memory, sets the second input of the comparator to the voltage for detecting the OFF event, stops emitting the light to the subject, stores the OFF event information in memory, and then sequentially transfers the ON event information and the OFF event information to a readout circuit.

(C-5)
The electronic apparatus according to (C-1),
in which the pixel has a function of detecting an ON event and an OFF event in parallel by using two comparators, the ON event indicating that an amount of change in photocurrent exceeds or equals an upper limit threshold, the OFF event indicating that an amount of change in photocurrent falls below or equals a lower limit threshold.

(C-6)
The electronic apparatus according to (C-5), in which one of the two comparators receives voltage based on photocurrent as a first input, receives voltage for detecting the ON event as a second input, and outputs a comparison result between the first input and the second input as ON event information, and
another of the two comparators receives voltage based on photocurrent as a first input, receives voltage for detecting the OFF event as a second input, and outputs a comparison result between the first input and the second input as OFF event information.

(C-7)
The electronic apparatus according to (C-6),
in which the control section performs a global reset of the first inputs of the comparators, emits light from the light source section to the subject, stores the ON event information in memory, stops emitting the light to the subject, stores the OFF event information in the memory, and then sequentially transfers the ON event information and the OFF event information to a readout circuit.

(C-8)
The electronic apparatus according to (C-1),
in which the pixel has a function of detecting an ON event by using a single comparator, the ON event indicating that an amount of change in photocurrent exceeds or equals an upper limit threshold.

(C-9)
The electronic apparatus according to (C-8),
in which the single comparator receives voltage based on photocurrent as a first input, receives voltage for detecting the ON event as a second input, and outputs a comparison result between the first input and the second input as ON event information.

(C-10)
The electronic apparatus according to (C-9),
in which the control section performs a global reset of the first input of the comparator, emits light from the light source section to the subject, stores the ON event information in memory, and then sequentially transfers the ON event information to a readout circuit.

(C-11)
The electronic apparatus according to (C-1),
in which the pixel has a function of detecting an OFF event by using a single comparator, the OFF event indicating that an amount of change in photocurrent falls below or equals a lower limit threshold.

(C-12)
The electronic apparatus according to (C-11),
in which the single comparator receives voltage based on photocurrent as a first input, receives voltage for detecting the OFF event as a second input, and outputs a comparison result between the first input and the second input as OFF event information.

(C-13)
The electronic apparatus according to (C-12),
in which the control section performs a global reset of the first input of the comparator, emits light from the light source section to the subject, turns on a reset switch connected between a first input terminal and an output terminal of the comparator, stops emitting the light to the subject, stores the OFF event information in the memory, and then sequentially transfers the OFF event information to a readout circuit.

(C-14)
The electronic apparatus according to (C-1),
in which a pixel array section of the event detection sensor includes both a first pixel and a second pixel, the first pixel having a function of using a comparator and detecting an ON event indicating that an amount of change in photocurrent exceeds or equals an upper limit threshold, the second pixel having a function of using a comparator and detecting an OFF event indicating that an amount of change in photocurrent falls below or equals a lower limit threshold.

(C-15)

The electronic apparatus according to (C-14),
in which the control section first performs a global reset of all pixels including the first pixel and the second pixel, emits light from the light source section to the subject, stores ON event information detected by the first pixel in memory, turns on a reset switch connected between a first input terminal and an output terminal of the comparator of the second pixel, stops emitting the light to the subject, stores OFF event information detected by the second pixel in memory, sequentially transfers the ON event information and the OFF event information to a readout circuit, and then performs the global reset of a first input of the comparator.

(C-16)

The electronic apparatus according to (C-14),
in which the control section first performs a global reset of all pixels including the first pixel and the second pixel, emits light from the light source section to the subject, stores ON event information detected by the first pixel in memory, sequentially transfers the ON event information to a readout circuit, turns on a reset switch connected between a first input terminal and an output terminal of the comparator of the second pixel, stops emitting the light to the subject, stores OFF event information detected by the second pixel in memory, sequentially transfers the OFF event information to the readout circuit, and then performs the global reset of a first input of the comparator.

(C-17)

The electronic apparatus according to any of (C-1) to (C-16),
in which the light source section includes a surface-emitting semiconductor laser.

(C18)

The electronic apparatus according to (C-17),
in which the surface-emitting semiconductor laser is a vertical-cavity surface-emitting laser.

(C-19)

The electronic apparatus according to (C-18),
in which the vertical-cavity surface-emitting laser projects light of a predetermined pattern onto the subject.

(D-1)

A system comprising:
a processor;
a light source controlled by the processor and configured to emit a light; and
an event based vision sensor controlled by the processor, wherein the sensor includes:
a plurality of pixels, wherein at least one of the plurality of pixels includes:
a photosensor configured to detect incident light; and
first circuitry configured to output a first signal based on an output from the photosensor, wherein the first signal indicates a change of amount of incident light, and
a comparator configured to output a comparison result based on the first signal and at least one of a first reference voltage and a second reference voltage,
wherein the processor is configured to apply one of the first reference voltage and the second reference voltage to the comparator selectively based on an operation of the light source.

(D-2)

The system according to (D-1), wherein the operation is one of on event signal detection and off event signal detection.

(D-3)

The system according to (D-2), wherein when the first reference voltage is applied to the comparator, the light source emits light and the sensor stores on event data in memory of the system.

(D-4)

The system according to (D-3), wherein when the second reference voltage is applied to the comparator, the light source ceases to emit light and the sensor stores off event data in the memory.

(D-5)

The system according to (D-4), wherein the stored on event data and off event data are sequentially transferred to a readout circuit.

(D-6)

The system according to (D-1), wherein the light source is a vertical-cavity surface-emitting laser.

(D-7)

The system according to (D-1), wherein the stored on event data and off event data are used to perform face detection processing.

(E-1)

A system comprising:
an image sensor configured to output an image signal;
a light source configured to emit a light;
an event based vision sensor configured to output an event signal, the event based vision sensor including:
a plurality of pixels, wherein at least one of the plurality of pixels includes:
a photosensor configured to detect incident light; and
first circuitry that outputs a first signal based on an output from the photosensor,
wherein the first signal indicates a change of amount of incident light; and
a comparator configured to output a comparison result based on the first signal and at least one of a first reference voltage and a second reference voltage;
a system controller configured to control the event based vision sensor and the light source synchronously; and
a processor configured to process the image signal and the event signal, wherein the system controller applies the first reference voltage and the second reference voltage to the comparator selectively based on an operation of the light source.

(E-2)

The system according to (E-1), wherein the image sensor comprises an RGB camera.

(E-3)

The system according to (E-1), wherein the operation is one of on event signal detection and off event signal detection.

(E-4)

The system according to (E-1), wherein when the first reference voltage is applied to the comparator, the light source emits light and the sensor stores on event data in memory of the system.

(E-5)

The system according to (E-4), wherein when the second reference voltage is applied to the comparator, the light source ceases to emit light and the sensor stores off event data in the memory.

(E-6)
The system according to (E-5), wherein the stored on event data and off event data are sequentially transferred to a readout circuit.

(E-7)
The system according to (E-5), wherein the stored on event data and off event data are used to perform face detection processing.

(E-8)
The system according to (E-5), wherein the on event data and the off event data are used to generate a depth map.

(E-9)
The system according to (E-8), wherein the depth map is used to recognize a face.

(E-10)
The system according to (E-9), wherein prior to applying the first reference voltage the face is detected with the image sensor.

(E-11)
The system according to (E-8), wherein the processor is configured to recognize a face using the depth map and the image signal.

(E-12)
The system according to (E-1), wherein the light source is a vertical-cavity surface-emitting laser.

(E-13)
The system according to (E-1), wherein the image sensor is controlled by a camera control section.

(F-1)
A method of driving a ranging system, the method comprising:
selectively applying, with a processor, one of a first reference voltage and a second reference voltage to a comparator based on an operation of a light source; and
comparing, with the comparator the one of the first reference voltage and the second reference voltage with a first signal output by circuitry of a pixel,
wherein:
the light source is controlled by the processor and configured to emit a light,
the pixel is one of a plurality of pixels included within an event based vision sensor,
the pixel includes a photosensor configured to detect incident light and first circuitry that outputs the first signal based on an output from the photosensor, and
the first signal indicates a change of amount of incident light.

(F-2)
The method according to (F-1), wherein the operation is one of on event signal detection and off event signal detection.

(F-3)
The method according to (F-2), wherein when the first reference voltage is applied to the comparator, the light source emits light and the sensor stores on event data in memory of the system.

(F-4)
The method according to (F-3), wherein when the second reference voltage is applied to the comparator, the light source ceases to emit light and the sensor stores off event data in the memory.

(F-5)
The method according to (F-4), wherein the stored on event data and off event data are sequentially transferred to a readout circuit.

(F-6)
The method according to (F-4), wherein the stored on event data and off event data are used to perform face detection processing.

(F-7)
The method according to (F-1), wherein the light source is a vertical-cavity surface-emitting laser.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Ranging system
10 Vertical-cavity surface-emitting laser (VCSEL)
11 Light source (point light source)
20 Event detection sensor (DVS)
21 Pixel
22 Pixel array section
23 Driving section
24 Arbiter section
25 Column processing section
26 Signal processing section
30 System control section
40 Light source driving section
50 Sensor control section
60 Light source side optical system
70 Camera side optical system
80 Readout circuit
91 RGB camera
92 Camera control section
100 Subject
200 Application processor

What is claimed is:
1. A system, comprising:
a processor;
a light source controlled by the processor and configured to emit a light; and
an event based vision sensor controlled by the processor, wherein the event based vision sensor includes:
a plurality of pixels, wherein at least one of the plurality of pixels includes:
a photosensor configured to detect incident light;
first circuitry configured to output a first signal based on an output from the photosensor, wherein the first signal indicates a change of amount of incident light; and
a comparator configured to output a comparison result based on the first signal and at least one of a first reference voltage and a second reference voltage,
wherein the processor is configured to apply one of the first reference voltage and the second reference voltage to the comparator selectively based on an operation of the light source,
wherein when the first reference voltage is applied to the comparator, the light source emits light and the event based vision sensor stores on event data in memory, and
wherein when the second reference voltage is applied to the comparator, the light source ceases to emit light and the event based vision sensor stores off event data in the memory.

2. The system of claim 1, wherein the stored on event data and off event data are sequentially transferred to a readout circuit.

3. The system of claim 1, wherein the stored on event data and off event data are used to perform face detection processing.

4. The system of claim 1, wherein the light source is a vertical-cavity surface-emitting laser.

5. A system, comprising:
an image sensor configured to output an image signal;
a light source configured to emit a light;
an event based vision sensor configured to output an event signal, the event based vision sensor including:
a plurality of pixels, wherein at least one of the plurality of pixels includes:
a photosensor configured to detect incident light; and
first circuitry that outputs a first signal based on an output from the photosensor, wherein the first signal indicates a change of amount of incident light; and
a comparator configured to output a comparison result based on the first signal and at least one of a first reference voltage and a second reference voltage;
a system controller configured to control the event based vision sensor and the light source synchronously; and
a processor configured to process the image signal and the event signal,
wherein the system controller applies the first reference voltage and the second reference voltage to the comparator selectively based on an operation of the light source,
wherein when the first reference voltage is applied to the comparator, the light source emits light and the event based vision sensor stores on event data in memory, and
wherein when the second reference voltage is applied to the comparator, the light source ceases to emit light and the event based vision sensor stores off event data in the memory.

6. The system of claim 5, wherein the image sensor comprises an RGB camera.

7. The system of claim 5, wherein the stored on event data and off event data are sequentially transferred to a readout circuit.

8. The system of claim 5, wherein the stored on event data and off event data are used to perform face detection processing.

9. The system of claim 5, wherein the on event data and the off event data are used to generate a depth map.

10. The system of claim 9, wherein the depth map is used to recognize a face.

11. The system of claim 10, wherein prior to applying the first reference voltage the face is detected with the image sensor.

12. The system of claim 9, wherein the processor is configured to recognize a face using the depth map and the image signal.

13. The system of claim 5, wherein the light source is a vertical-cavity surface-emitting laser.

14. The system of claim 5, wherein the image sensor is controlled by a camera control section.

15. A method of driving a ranging system, the method comprising:
selectively applying, with a processor, one of a first reference voltage and a second reference voltage to a comparator based on an operation of a light source; and
comparing, with the comparator the one of the first reference voltage and the second reference voltage with a first signal output by circuitry of a pixel, wherein:
the light source is controlled by the processor and configured to emit a light,
the pixel is one of a plurality of pixels included within an event based vision sensor,
the pixel includes a photosensor configured to detect incident light and first circuitry that outputs the first signal based on an output from the photosensor, and
the first signal indicates a change of amount of incident light,
when the first reference voltage is applied to the comparator, the light source emits light and the event based vision sensor stores on event data in memory, and
when the second reference voltage is applied to the comparator, the light source ceases to emit light and the event based vision sensor stores off event data in the memory.

16. The method of claim 15, wherein the stored on event data and off event data are sequentially transferred to a readout circuit.

17. The method of claim 15, wherein the stored on event data and off event data are used to perform face detection processing.

18. The method of claim 15, wherein the light source is a vertical-cavity surface-emitting laser.

* * * * *